(12) United States Patent
Lim et al.

(10) Patent No.: US 11,750,818 B2
(45) Date of Patent: *Sep. 5, 2023

(54) INTER-PREDICTION MODE BASED IMAGE PROCESSING METHOD, AND APPARATUS THEREFOR

(71) Applicant: Rosedale Dynamics LLC, Wilmington, DE (US)

(72) Inventors: Jaehyun Lim, Seoul (KR); Naeri Park, Seoul (KR)

(73) Assignee: Rosedale Dynamics LLC, Wilmington, DE (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/377,160

(22) Filed: Jul. 15, 2021

(65) Prior Publication Data

US 2021/0344926 A1 Nov. 4, 2021

Related U.S. Application Data

(63) Continuation of application No. 16/089,455, filed as application No. PCT/KR2016/003165 on Mar. 28, 2016, now Pat. No. 11,095,898.

(51) Int. Cl.
*H04N 19/137* (2014.01)
*H04N 19/176* (2014.01)
(Continued)

(52) U.S. Cl.
CPC ......... *H04N 19/137* (2014.11); *H04N 19/105* (2014.11); *H04N 19/176* (2014.11);
(Continued)

(58) Field of Classification Search
CPC .. H04N 19/137; H04N 19/105; H04N 19/176; H04N 19/51; H04N 19/521; H04N 19/96
See application file for complete search history.

(56) References Cited

U.S. PATENT DOCUMENTS

| 11,095,898 B2 | 8/2021 | Lim et al. |
| 2005/0041842 A1* | 2/2005 | Frakes ...................... G06T 7/11 |
| | | 382/128 |

(Continued)

FOREIGN PATENT DOCUMENTS

| JP | H09172644 | 6/1997 |
| KR | 1020090083290 | 8/2009 |

(Continued)

OTHER PUBLICATIONS

International Search Report and Written Opinion in International Application No. PCT/KR2016/003165, dated Dec. 9, 2016, 21 pages (with Machine Translation).

(Continued)

*Primary Examiner* — Santiago Garcia
(74) *Attorney, Agent, or Firm* — Fish & Richardson P.C.

(57) ABSTRACT

In the present invention, an inter-prediction mode based image processing method and an apparatus therefor are disclosed. Specifically, the inter-prediction based image processing method may comprise the steps of: deriving movement information of a control point for specifying a reference block of a current block; dividing the current block into sub-blocks; deriving movement information of the sub-blocks using the movement information of the control point; and generating a prediction block for each sub-block using the movement information of the sub-blocks.

20 Claims, 20 Drawing Sheets

(51) Int. Cl.
*H04N 19/51* (2014.01)
*H04N 19/513* (2014.01)
*H04N 19/96* (2014.01)
*H04N 19/105* (2014.01)

(52) U.S. Cl.
CPC ........... *H04N 19/51* (2014.11); *H04N 19/521* (2014.11); *H04N 19/96* (2014.11)

(56) References Cited

U.S. PATENT DOCUMENTS

| | | | |
|---|---|---|---|
| 2005/0100097 A1* | 5/2005 | Yoo | H04N 19/51 375/240.16 |
| 2007/0126938 A1* | 6/2007 | Tan | H04N 21/4316 348/739 |
| 2007/0291843 A1* | 12/2007 | Chappalli | H04N 19/51 375/240.27 |
| 2008/0084932 A1* | 4/2008 | Wang | H04N 19/70 375/240.24 |
| 2008/0198931 A1* | 8/2008 | Chappalli | H04N 19/577 375/E7.123 |
| 2008/0310734 A1* | 12/2008 | Ahammad | G06K 9/00711 382/209 |
| 2011/0103487 A1* | 5/2011 | Pateux | H04N 19/543 375/240.16 |
| 2011/0222792 A1* | 9/2011 | Kusakabe | H04N 19/14 382/248 |
| 2012/0051430 A1* | 3/2012 | Pateux | H04N 19/17 375/240.16 |
| 2013/0315312 A1* | 11/2013 | Amano | H04N 19/61 375/240.16 |
| 2014/0320478 A1* | 10/2014 | Oh | G09G 3/3614 345/212 |
| 2015/0352361 A1* | 12/2015 | Wu | A61N 1/36046 607/54 |
| 2016/0210715 A1* | 7/2016 | Chida | G06T 1/60 |
| 2016/0286232 A1* | 9/2016 | Li | H04N 19/139 |
| 2016/0323573 A1* | 11/2016 | Ikai | H04N 19/30 |
| 2017/0094305 A1* | 3/2017 | Li | H04N 19/136 |
| 2017/0134750 A1* | 5/2017 | Ikai | H04N 19/159 |
| 2018/0007379 A1* | 1/2018 | Park | H04N 19/159 |
| 2019/0124332 A1 | 4/2019 | Lim et al. | |
| 2019/0174136 A1* | 6/2019 | Jun | H04N 19/593 |
| 2019/0200040 A1* | 6/2019 | Lim | H04N 19/96 |

FOREIGN PATENT DOCUMENTS

| | | |
|---|---|---|
| KR | 1020140113854 | 9/2014 |
| KR | 101451923 | 10/2014 |
| KR | 101643121 | 7/2016 |
| WO | WO 2015099816 | 7/2015 |

OTHER PUBLICATIONS

International Preliminary Report on Patentability in International Appln. No. PCT/KR2016/003165, dated Oct. 11, 2018, 15 pages (with Machine Translation).

* cited by examiner

Depth = 0

Depth = 1

Depth = 2

Depth = 3

Intra:

2Nx2N

NxN

Inter:

2Nx2N

NxN

2NxN

Nx2N nLx2N nRx2N

2NxnU

2NxnD

FIG. 6

Merge Candidate List

| Index | Motion parameter |
|---|---|
| 0 | Motion parameter of A1 |
| 1 | Motion parameter of B1 |
| 2 | Motion parameter of B0 |
| 3 | Motion parameter of A0 |
| 4 | Motion parameter of T0 |

→ Signaling of "Index 1"

INTER-PREDICTION MODE BASED IMAGE PROCESSING METHOD, AND APPARATUS THEREFOR

CROSS-REFERENCE TO RELATED APPLICATIONS

This application is a continuation of U.S. application Ser. No. 16/089,455, filed on Sep. 28, 2018, which is a National Stage application under 35 U.S.C. § 371 of International Application No. PCT/KR2016/003165, filed on Mar. 28, 2016, the disclosures of which are incorporated herein by reference in their entirety.

TECHNICAL FIELD

The present invention relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

SUMMARY

In the existing compression technology of a still image or moving image, motion prediction is performed in a prediction block unit upon performing inter-frame prediction. In this case, there is a problem in that prediction accuracy is deteriorated because only a parallel-moved block-based prediction method is applied although prediction blocks of various sizes are supported in order to find an optimal prediction block for a current block.

In order to solve the problem, an object of the present invention is to propose a method of processing an inter-prediction-based image into which the distortion of an image may be incorporated.

Furthermore, an object of the present invention is to propose a method of processing an inter-prediction-based image into which motion information of a sub-block within a block or a pixel unit may be incorporated.

Technical objects to be achieved in the present invention are not limited to the aforementioned technical objects, and other technical objects not described above may be evidently understood by a person having ordinary skill in the art to which the present invention pertains from the following description.

Technical Solution

In an aspect of the present invention, a method of processing an image based on inter-prediction may include deriving motion information of a control point for specifying a reference block of a current block, splitting the current block into sub-blocks, deriving motion information of the sub-block using the motion information of the control point, and generating a prediction block in units of sub-block using the motion information of the sub-block.

In an aspect of the present invention, an apparatus for processing an image based on inter-prediction may include a control point motion information derivation unit deriving motion information of a control point for specifying a reference block of a current block, a sub-block split unit splitting the current block into sub-blocks, a sub-block motion information derivation unit deriving motion information of the sub-block using motion information of the control point, and a prediction block generation unit generating a prediction block in units of sub-block using the motion information of the sub-block.

Preferably, the motion information of the control point may be derived from motion information of a neighboring block or motion information of a reference block of another picture in a time domain.

Preferably, the motion information of the control point may be derived by correcting the motion information of the neighboring block or the reference block based on a difference between the size of the current block and the size of the neighboring block or the reference block.

Preferably, the motion information of the control point may be derived by correcting the motion information of the neighboring block or the reference block based on a difference between the coordinate of a control point of the neighboring block or the reference block and the coordinate of the control point of the current block, and a gradient of the control point of the neighboring block or the reference block with respect to a horizontal/vertical direction.

Preferably, the size of the sub-block and/or a split type of the sub-block may be determined based on the motion information of the control point.

Preferably, the width of the sub-block may be determined based on a difference between motion information of an upper left control point of the current block and motion information of an upper right control point of the current block. The height of the sub-block may be determined based on a difference between motion information of an upper left control point of the current block and motion information of a lower left control point of the current block.

Preferably, motion information of a specific reference point in the sub-block may be used as the motion information of the sub-block.

Preferably, in case of a sub-block including the control point or adjacent to the control point, motion information of the control point may be used as the motion information of the sub-block.

Preferably, motion information of a plurality of reference points in the sub-block may be used as the motion information of the sub-block.

Preferably, the method may further include the step of updating the prediction block on a pixel-by-pixel basis by applying an optical flow.

Preferably, the prediction block may be generated using motion information of a single reference point. The generated prediction block may be updated on a pixel-by-pixel basis by applying the optical flow to a plurality of prediction blocks derived using motion information of a plurality of reference points.

Preferably, the optical flow may be applied only to sub-blocks that do not include the control point or are not adjacent to the control point.

Preferably, the motion information of the sub-block may be derived by applying an affine transformation using the motion information of the control point.

Advantageous Effects

In accordance with an embodiment of the present invention, accuracy of prediction can be improved by incorporating the distortion of an image because an inter-prediction-based image is processed using an affine transformation.

Furthermore, in accordance with an embodiment of the present invention, accuracy of prediction can be increased and an additional computational load or memory access can be reduced because a prediction block is generated in units of sub-block when the prediction block is generated.

Furthermore, in accordance with an embodiment of the present invention, compression performance of an image can be enhanced by incorporating motion information of a pixel unit into prediction by applying an optical flow algorithm.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 6 is an embodiment to which the present invention may be applied and illustrates integers for ¼ sample interpolation and a fraction sample locations.

DETAILED DESCRIPTION

Figure 1:
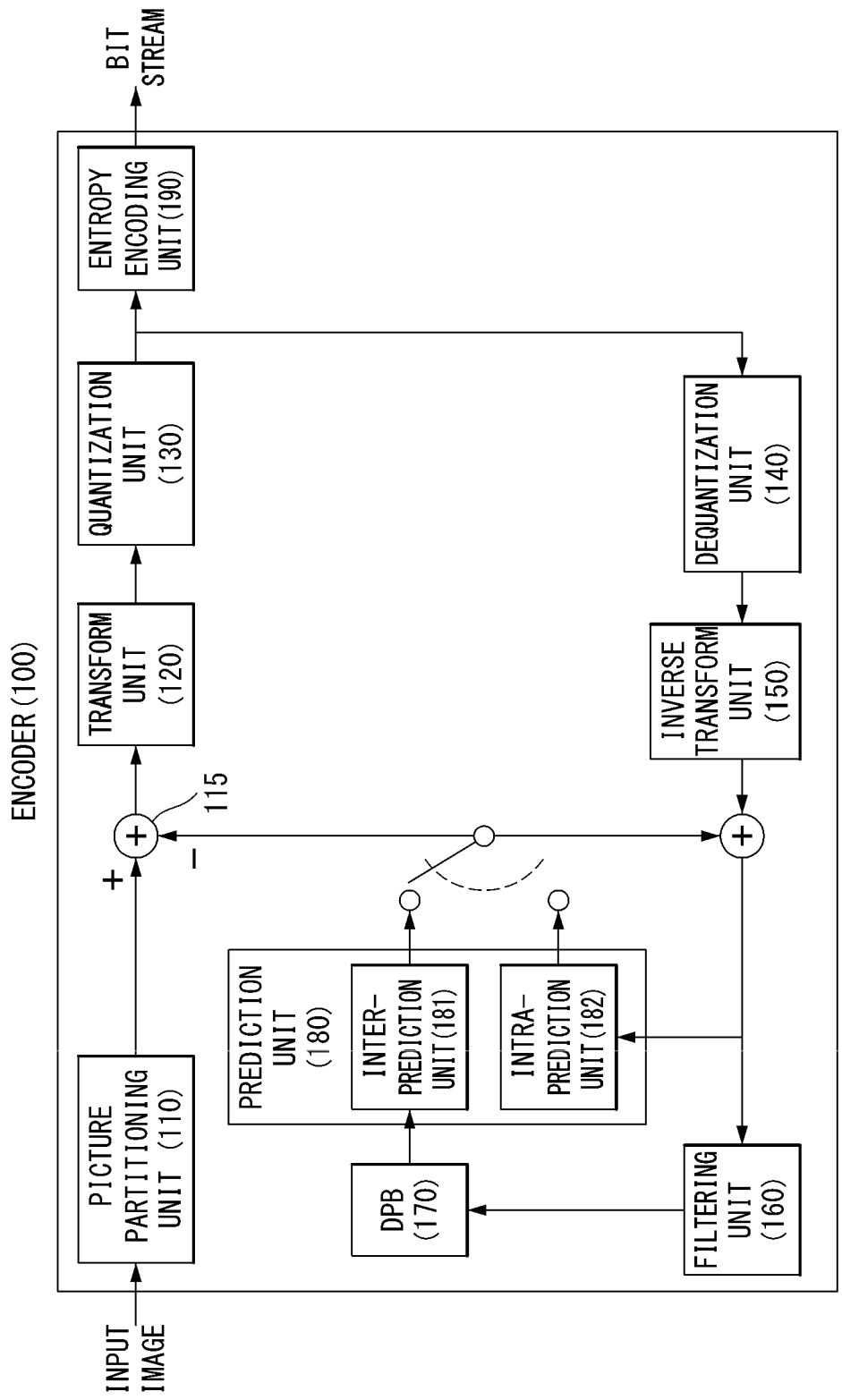
FIG. 1 is illustrates a schematic block diagram of an encoder in which the encoding of a still image or video signal is performed, as an embodiment to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present invention is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

Specifically, the inter-prediction unit 181 according to the present invention may further include an element for generating a prediction block in units of sub-block by applying an affine transformation and updating the prediction block on a pixel-by-pixel basis by applying an optical flow. This is described in detail later.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

Figure 2:
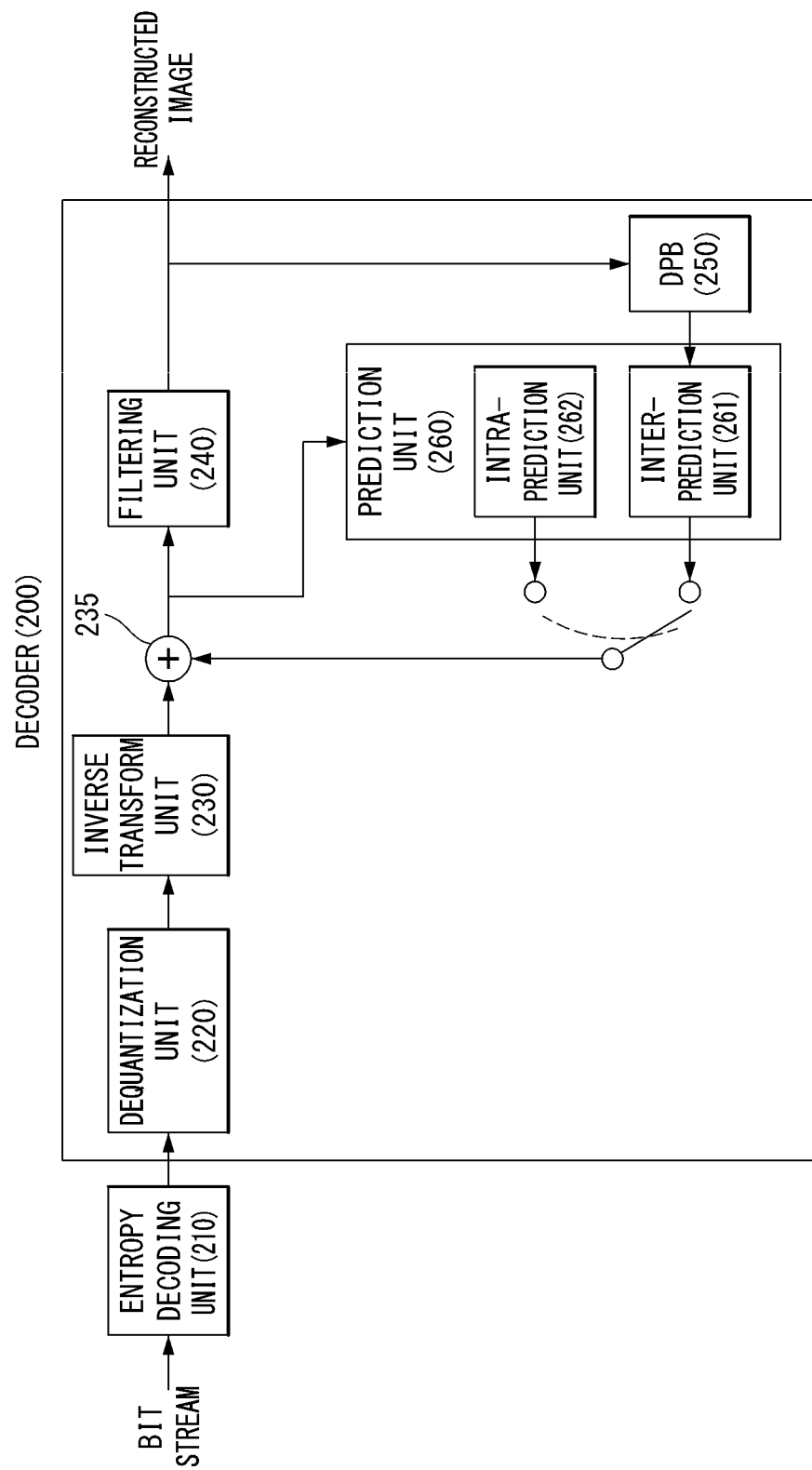
FIG. 2 illustrates a schematic block diagram of a decoder in which decoding of a still image or video signal is performed, as an embodiment to which the present invention is applied.

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Specifically, the inter-prediction unit 261 according to the present invention may further include an element for generating a prediction block in units of sub-block by applying an affine transformation and updating the prediction block on a pixel-by-pixel basis by applying an optical flow. This is described in detail later.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

Figure 3A:
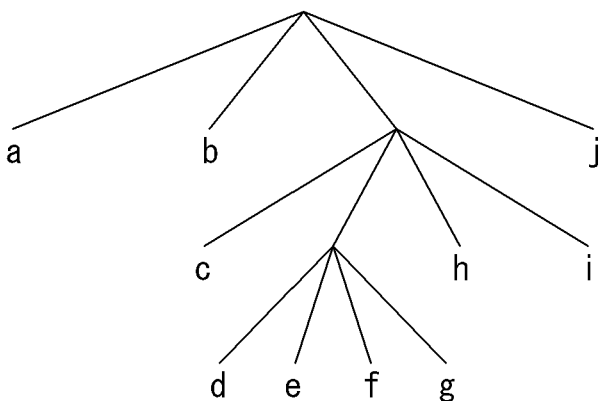
FIGS. 3A and 3B are diagrams for describing a split structure of a coding unit that may be applied to the present invention.
Figure 3B:
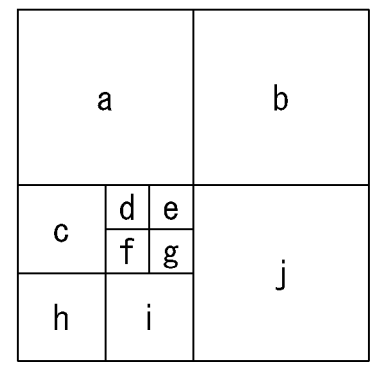

FIGS. 3A and 3B are diagrams for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIGS. 3A and 3B, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3B, a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3B, a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3B, a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

Figure 4:
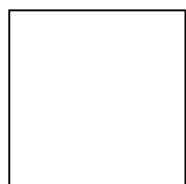
FIG. 4 is a diagram for describing a prediction unit that may be applied to the present invention.
Figure 4:
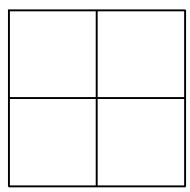
Figure 4:
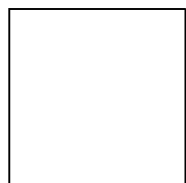
Figure 4:
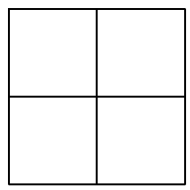
Figure 4:
Figure 4:
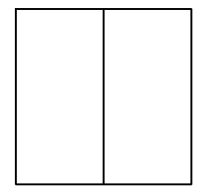
Figure 4:
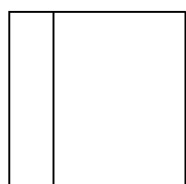
Figure 4:
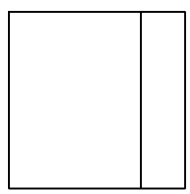
Figure 4:
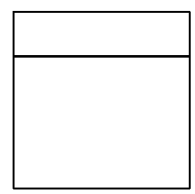
Figure 4:
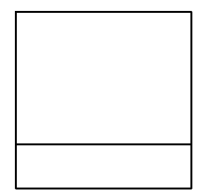

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIGS. 3A and 3B, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIGS. 3A and 3B, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3B, a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3B, a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3B, a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

Figure 5A:
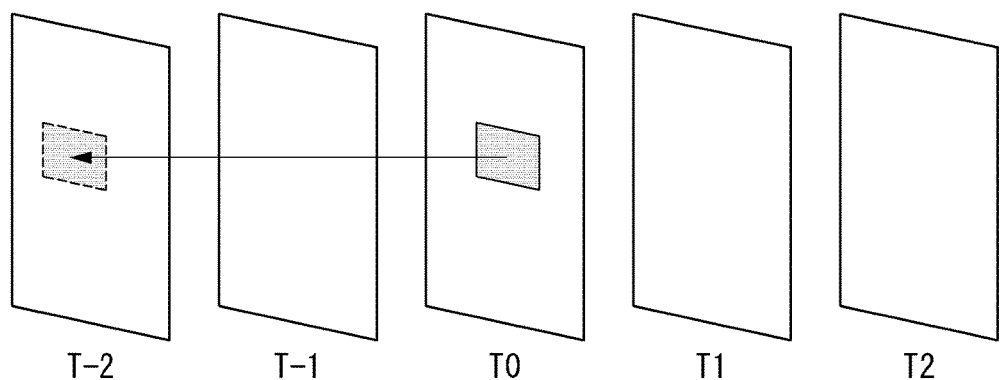
FIGS. 5A and 5B are embodiments to which the present invention may be applied and is a diagram illustrating the direction of inter-prediction.
Figure 5B:
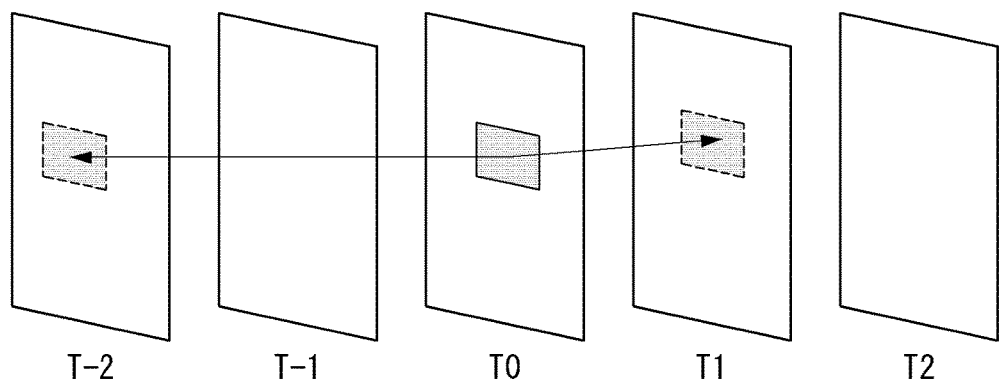

FIGS. 5A and 5B are embodiments to which the present invention may be applied and is a diagram illustrating the direction of inter-prediction.

Referring to FIGS. 5A and 5B, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

Figure 6:
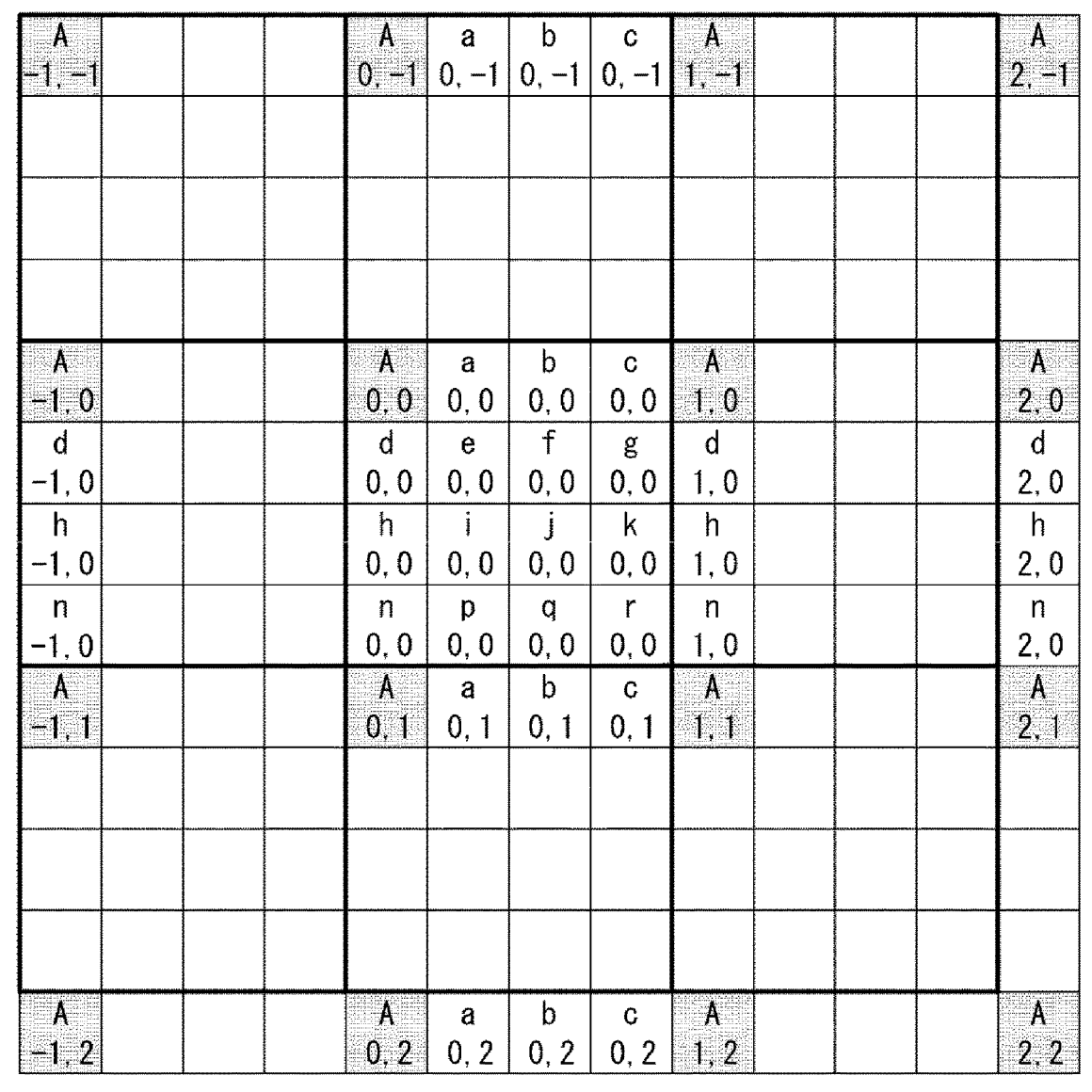

FIG. 6 is an embodiment to which the present invention may be applied and illustrates integers for ¼ sample interpolation and a fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

Figures 7A, 7B:
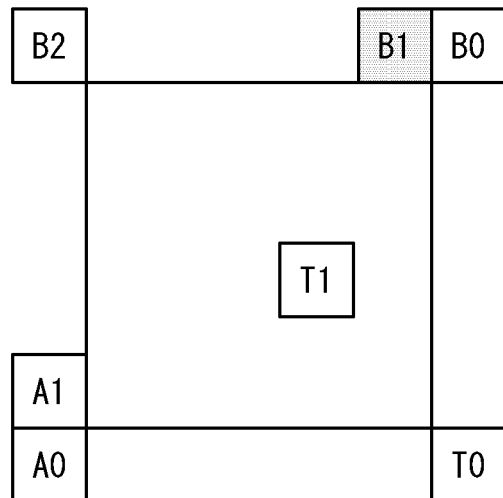
FIGS. 7A and 7B are embodiments to which the present invention may be applied and illustrates the location of a spatial candidate.

FIGS. 7A and 7B are embodiments to which the present invention may be applied and illustrates the location of a spatial candidate.

Referring to FIG. 7A, whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7B illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIGS. 7A and 7B are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

Figure 8:
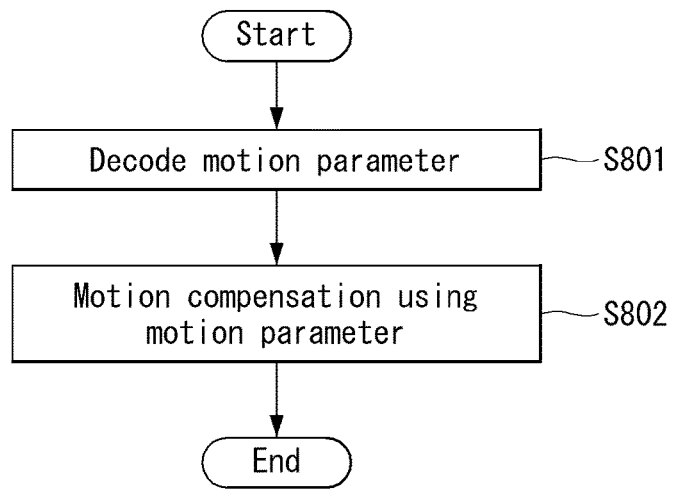
FIG. 8 is an embodiment to which the present invention is applied and is a diagram illustrating an inter-prediction method.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

Figure 9:
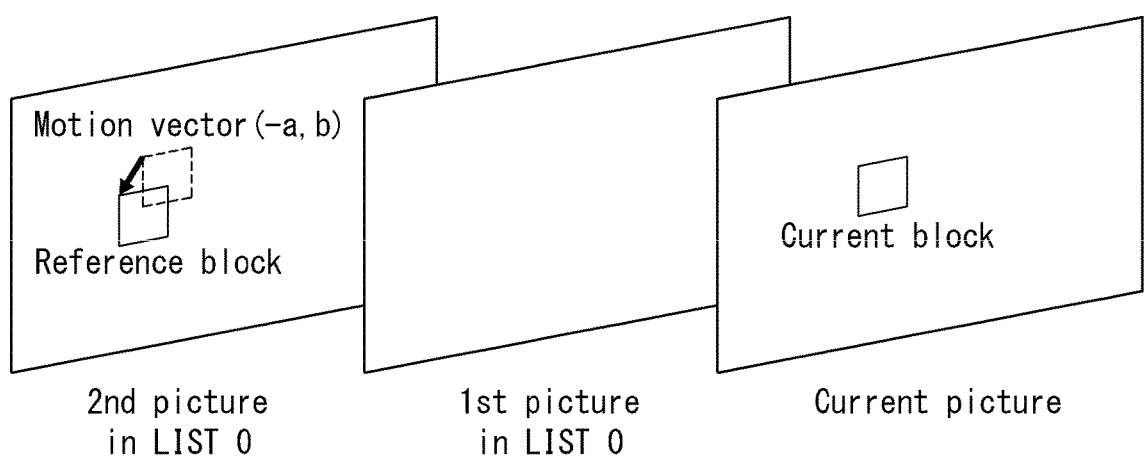
FIG. 9 is an embodiment to which the present invention may be applied and is a diagram illustrating a motion compensation process.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Inter-Prediction-Based Image Processing Method

The present invention proposes a method of processing an image based on inter-prediction using a prediction method into which the distortion of an image has been incorporated in addition to a parallel-moved block-based prediction method in order to improve performance of inter-frame prediction (i.e., inter-prediction). Furthermore, the present invention proposes a method of improving moving image compression performance so that motion information of a sub-block within a block or a pixel unit can be incorporated in order to improve accuracy of an inter-prediction method into which distortion has been incorporated.

Various methods may be used to represent the distortion of an image. Particularly, different methods may be applied depending on the degree of distortion and/or the type of distortion.

An affine transformation of such various methods is a method of modeling the distortion of a specific image, including the enlargement/reduction of an image and the rotation of an image.

A method of indicating an affine transformation is various. From among the various methods, the present invention proposes an inter-frame prediction (i.e., inter-prediction) method of displaying (or identifying) and using distortion between images using motion information at a specific reference point (or a reference pixel/sample) of a block prior to distortion.

This is described below with reference to the following drawing.

Figure 10:
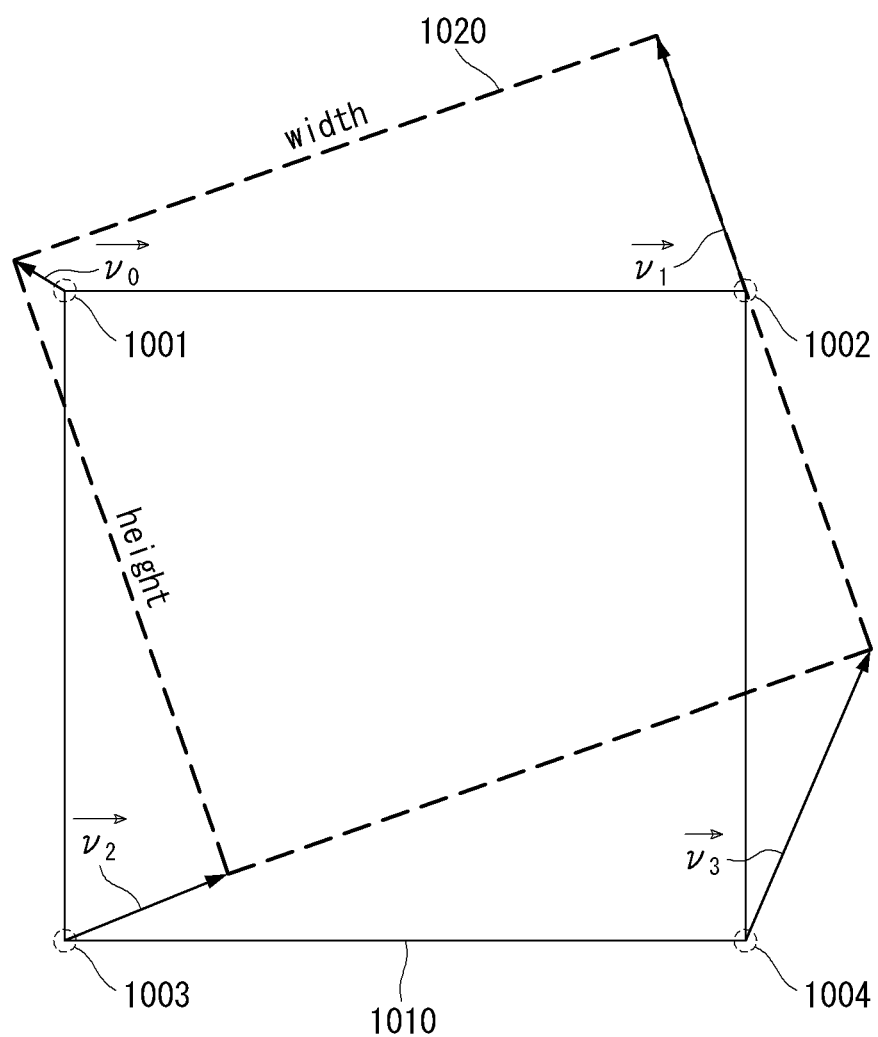
FIG. 10 illustrates a common form of an affine transformation as an embodiment to which the present invention may be applied.

FIG. 10 illustrates a common form of an affine transformation as an embodiment to which the present invention may be applied.

When distortion, such as warping or rotation, occurs between a reference image and a current image, a block within the current image may correspond to one warped reference block. That is, each of the upper left reference point 1001, upper right reference point 1002, lower left reference point 1003 and lower left reference point 1004 of a current block 1010 may have independent motion information. In this case, the reference points 1001, 1002, 1003 and 1004 may be pixels included in the current block or are not included in the current block, but may be pixels neighboring to the current block. For example, the upper left reference point 1001 may correspond to a pixel included in the current block, and the upper right reference point 1002, the lower left reference point 1003 and the lower left reference point 1004 are not included in the current block, but may correspond to pixels neighboring to the current block.

Furthermore, a reference block 1020 for the current block 1010 may be specified using motion information of one or more of the reference points. The prediction block of the current block 1010 may be generated from the specified reference block 1020.

A reference point (or reference pixel/sample) used to specify such a reference block may be called a control point (CP) (or a control pixel/sample). A motion vector at such a reference point may be called a control point vector (CPV). The degree of distortion that may be represented is different depending on the number of control points. This is described below with reference to the following drawing.

Figure 11A:
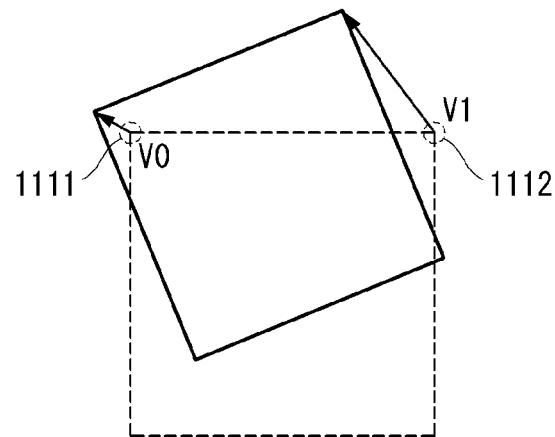
FIGS. 11A to 11C are diagrams for illustrating a change in the distortion form attributable to a control point as an embodiment to which the present invention may be applied.
Figure 11B:
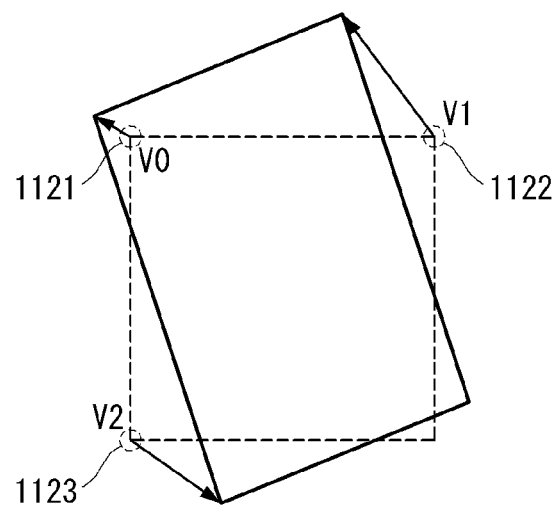
Figure 11C:
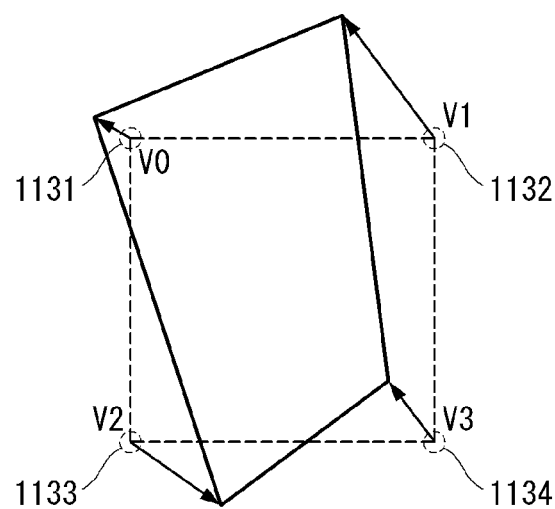

FIGS. 11A to 11C are diagrams for illustrating a change in the distortion form attributable to a control point as an embodiment to which the present invention may be applied.

FIG. 11A illustrates a case where two reference points 1111 and 1112 are used as CPs. FIG. 11B illustrates a case where three reference points 1121, 1122 and 1123 are used as CPs. FIG. 11C illustrates a case where four reference points 1131, 1132, 1133, and 1134 are used as CPs.

As in FIGS. 11A to 11C, the degree of distortion that may be represented with respect to a current block may be different depending on the number of CPs used.

For example, as in FIG. 11A, if only the motion vector V0 of the CP 1 1111 and the motion vector V1 of the CP 2 1112 are used, only distortion of an enlarged or reduced or rotated form of a current block may be represented.

In contrast, as in FIG. 11B, if the motion vector V0 of the CP 1 1121, the motion vector V1 of the CP 2 1122, and the motion vector V2 of the CP 3 1123 are used, distortion of a parallelogram form may be represented in addition to distortion of an enlarged or reduced or rotated form of a current block.

Furthermore, as in FIG. 11C, if the motion vector V0 of the CP 1 1131, the motion vector V1 of the CP 2 1132, the motion vector V2 of the CP 3 1133, and the motion vector V3 of the CP 4 1134 are used, distortion of a specific form may be represented in addition to distortion of an enlarged or reduced or rotated form or a parallelogram form of a current block.

In accordance with the existing block-based image compression method, when a prediction block for inter-prediction-based image compression is generated, if only parallel-moved block-based prediction is performed, it is difficult to incorporate the distortion of an image. Accordingly, accuracy of a predicted block can be improved by generating the prediction block in which the distortion of an image has been taken into consideration by incorporating the aforementioned affine transformation into the prediction block.

Meanwhile, in the process of generating a prediction block into which the distortion of an image has been incorporated using the affine transformation as described above, accuracy of the prediction block can be further improved by incorporating motion information of a sub-block or a pixel unit. In this case, if different prediction information is applied in a too small unit, a corresponding computational load may be increased or an excessive memory access problem may occur in a process for the encoder/decoder to generate a prediction block.

Accordingly, the present invention proposes a method for incorporating motion information of a sub-block or a pixel unit and also improving moving image compression performance by increasing additional supplementary information or reducing the memory access problem in order to further improve accuracy in generating a prediction block into which the distortion of an image has been incorporated using the affine transformation in order to improve performance of inter-frame prediction.

Embodiment 1

Figure 12:
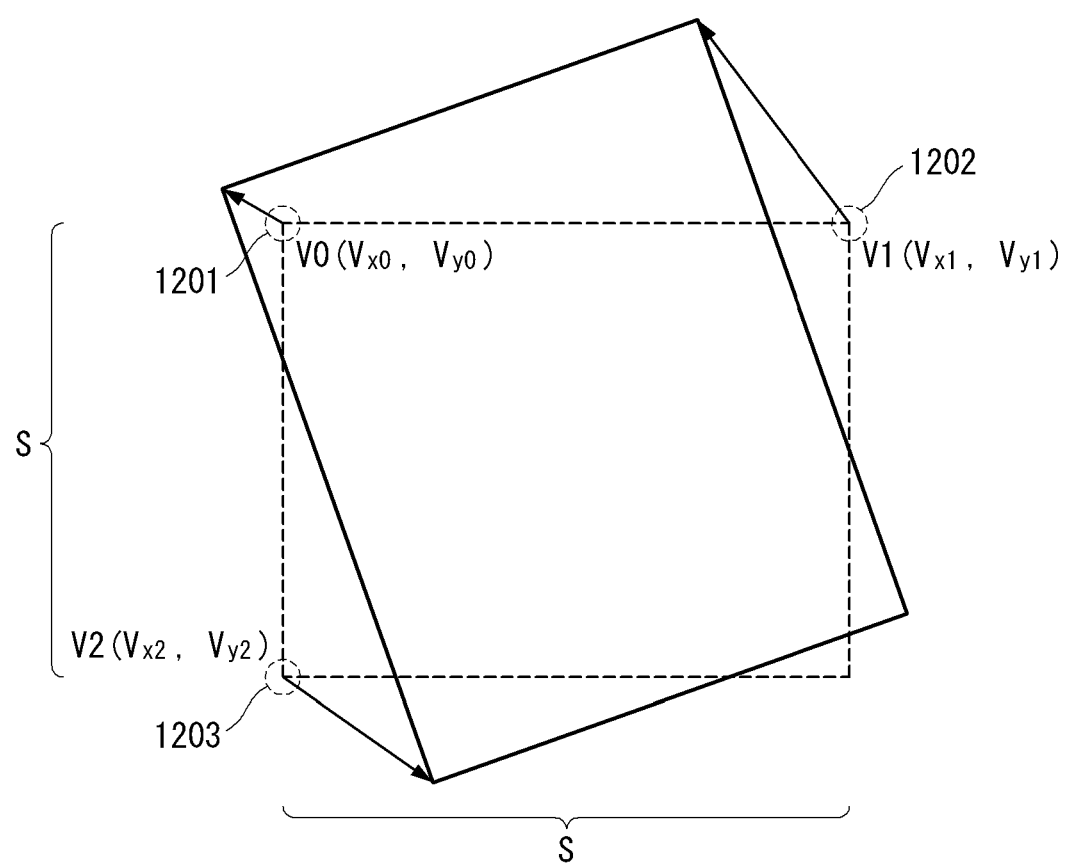
FIG. 12 is a diagram illustrating an affine transformation according to an embodiment of the present invention.

FIG. 12 is a diagram illustrating an affine transformation according to an embodiment of the present invention.

If the motion vector V0 (V_x0, V_y0) of a CP 1 1201, the motion vector V1 (V_x1, V_y1) of a CP 2 1202, and the motion vector V2(V_x2, V_y2) of a CP 3 1203 are present, the motion vector (Vx, Vy) of a pixel (or sample) at a specific position within a block may be determined as follows.

$$\begin{cases} x' = ax + by + e \\ y' = cx + dy + f \\ vx = x - x' \\ vy = y - y' \end{cases} \overset{\Delta}{\Rightarrow} \begin{cases} vx = (1-a)x - by - e \\ vy = (1-d)y - cx - f \end{cases} \quad \text{[Equation 1]}$$

In Equation 1, x, y indicate the x-axis coordinates (i.e., horizontal coordinates) and y-axis coordinates (i.e., vertical coordinates) of each pixel (pixel A) at a specific position within a current block, respectively. Furthermore, x', y' indicate the x-axis coordinates and y-axis coordinates of a corresponding pixel (i.e., a pixel A' corresponding to a pixel A) within a distorted block (i.e., a reference block).

The coordinates (x', y') of the corresponding pixel (i.e., the pixel A' corresponding to the pixel A) within the distorted block (i.e., the reference block) may be indicated as a primary equation including the coordinates (x, y) of a pixel (pixel A) at a specific position within the current block and six parameters a, b, c, d, e, f (i.e., x'=ax+by+e, y'=cx+dy+f).

The x-axis element Vx of the motion vector of the pixel (pixel A) at a specific position may be calculated as x-x', and the y-axis element Vy thereof may be calculated as y-y'. The motion vector (Vx, Vy) of a specific pixel may be represented as a primary equation, including the x, y coordinates of the corresponding specific pixel and the six parameters a, b, c, d, e, f, like an equation on the right of Equation 1 by substituting the coordinates (x', y') (i.e., x'=ax+by+e, y'=cx+dy+f) of the corresponding pixel (i.e., the pixel A' corresponding to the pixel A) within the distorted block (i.e., the reference block) into each equation.

If the size (i.e., width and height) of the current block is S and the coordinates of the CP 1 1201 is (0, 0) as in FIG. 12, the coordinates of the CP 2 1202 may be indicated as (S, 0), and the coordinates of the CP 3 1203 may be indicated as (0, S).

If the coordinates of each CP assumed as described above are substituted into an equation on the right of Equation 1, the six parameters a, b, c, d, e, f may be indicated as the motion vectors (i.e., V0(V_x0, V_y0), V1(V_x1, V_y1), and V2(V_x2, V_y2)) of the CPs, respectively. Accordingly, the equation on the right of Equation 1 may be represented like Equation 2 below.

$$\begin{cases} v_x = \dfrac{v_{x_1} - v_{x_0}}{S}x + \dfrac{v_{x_2} - v_{x_0}}{S}y + v_{x_0} \\ v_y = \dfrac{v_{y_1} - v_{y_0}}{S}x + \dfrac{v_{y_2} - v_{y_0}}{S}y + v_{y_0} \end{cases}$$ [Equation 2]

As in Equation 2, the motion vector (Vx, Vy) of a pixel (or sample) at a specific position within a block may be determined based on the motion vectors V0, V1, and V2 of the CP of a corresponding block and the size S of the corresponding block.

FIG. 12 illustrates an affine transformation using the three CPs, for convenience of description, but the present invention is not limited thereto. The same or similar method may be used for an affine transformation using two or four CPs.

That is, the motion vector of a specific pixel (or sample) within a current block may be determined based on motion information of a CP of a corresponding block and the size of the corresponding block.

In this case, the motion information V0, V1, V2 in each CP of the current block may be obtained from motion information of a neighboring block or may be obtained from motion information of the reference block of a temporally different reference picture. That is, as in the aforementioned merge mode, motion information V0, V1, V2 in each CP may be derived from motion information of a neighboring block (or motion information of a specific CP of the neighboring block) or motion information of the reference block of a temporally different reference picture (or motion information of a specific CP of a reference block).

Alternatively, the motion information V0, V1, V2 in each CP of the current block may be obtained by adding up motion information of a neighboring block (or motion information of a specific CP of the neighboring block) or motion information of the reference block of a temporally different reference picture (or motion information of a specific CP of the reference block) and correction information. For example, as in the AMVP mode, a motion vector predicator in each CP of a current block may be derived from motion information of a neighboring block (or motion information of a specific CP of a neighboring block) or motion information obtained from the reference block of a temporally different reference picture (or motion information of a specific CP of the reference block). Furthermore, the motion information V0, V1, V2 in each CP of the current block may be derived by adding up motion vector differences (i.e., correction information) signaled by the encoder.

In this case, the correction information may be obtained from the decoder through supplementary information signaled by the encoder.

Alternatively, the decoder may derive the correction information from motion information of a neighboring block (or motion information of a specific CP of the neighboring block) or motion information obtained from the reference block of a temporally different reference picture (or motion information of a specific CP of the reference block). This is described below with reference to the following drawing.

Figure 13:
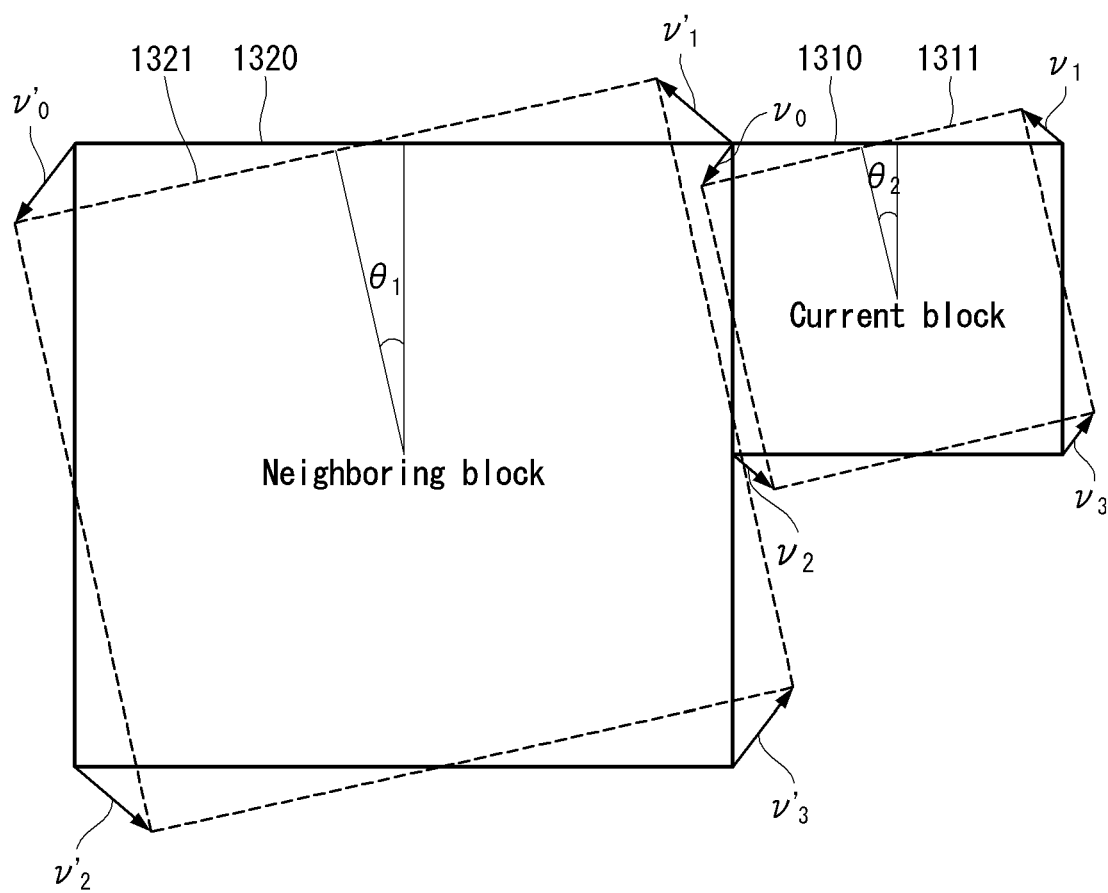
FIG. 13 is a diagram illustrating a method of deriving motion information of a control point according to an embodiment of the present invention.

FIG. 13 is a diagram illustrating a method of deriving motion information of a control point according to an embodiment of the present invention. FIG. 13 illustrates a case where both the center points of a current block 1310 and neighboring block 1320 correspond to the center points of rotation and the rotation angle θ_1 of the neighboring block and the rotation angle θ_2 of the current block are the same. That is, FIG. 13 illustrates a case where the current block 1310 is rotated around the center point of the block while having the same size and form compared to a reference block 1311 and the neighboring block 1320 is rotated around the center point of the block while having the same size and form compared to a reference block 1321 of the neighboring block.

The encoder/decoder may generate the motion vector of each CP of the current block 1310 using the motion vector of a corresponding CP within the neighboring block 1320. That is, V_0 may be generated using V'_0, V_1 may be generated using V'_1, V_2 may be generated using V'_2, and V_4 may be generated using V'_4.

In this case, both the neighboring block 1320 and the current block 1310 have the same form/size and are rotated around their center points with respect to the reference block. The rotation angle θ_1 of the neighboring block and the rotation angle θ_2 of the current block are the same. Accordingly, the slope of the motion vector of each CP of the current block 1310 (i.e., a ratio of a motion vector in a horizontal direction and a motion vector in a vertical direction) may be the same as the slope of the motion vector of a corresponding CP of the neighboring block 1320. That is, the slopes of V_0 and V'_0 may be the same, the slopes of V_1 and V'_1 may be the same, the slopes of V_2 and V'_2 may be the same, the slopes of V_3 and V'_3 may be the same, and the slopes of V_4 and V'_4 may be the same.

If the current block 1310 and the neighboring block 1320 have the same size, in the case of FIG. 13, the motion vector of each CP within the current block 1310 may be derived identically with the motion vector of each corresponding CP of the neighboring block 1320.

In this case, if the sizes of the current block 1310 and the neighboring block 1320 are different, the size of the motion vector of each CP of the current block 1310 may be different from the size of the motion vector of a corresponding CP within the neighboring block 1320.

Accordingly, the encoder/decoder may derive the motion vector of each CP of the current block 1310 using the motion vector of a corresponding CP within the neighboring block 1320, and may perform correction using the ratio of the size of the current block 1310 and the size of the neighboring block 1320.

Meanwhile, FIG. 13 illustrates a case where the size of the neighboring block is greater than the size of the current block, but the present invention is not limited thereto. The above method may be identically applied to a case where the size of a neighboring block is smaller than the size of a current block.

Furthermore, FIG. 13 illustrates only a case where the motion vector of a CP of a current block is derived from the motion vector of a CP of a neighboring block, for convenience of description. However, the above method may be identically applied to a case where the motion vector of a CP of a current block is derived from the motion vector of a CP of a block of a temporally different reference picture.

If each block is rotated around a center point at the same angle as in FIG. 13, the distortion of a specific image, including enlargement/reduction, rotation, and parallel movement, may occur between a reference image and a current image. This is described below with reference to the following drawing.

Figure 14A:
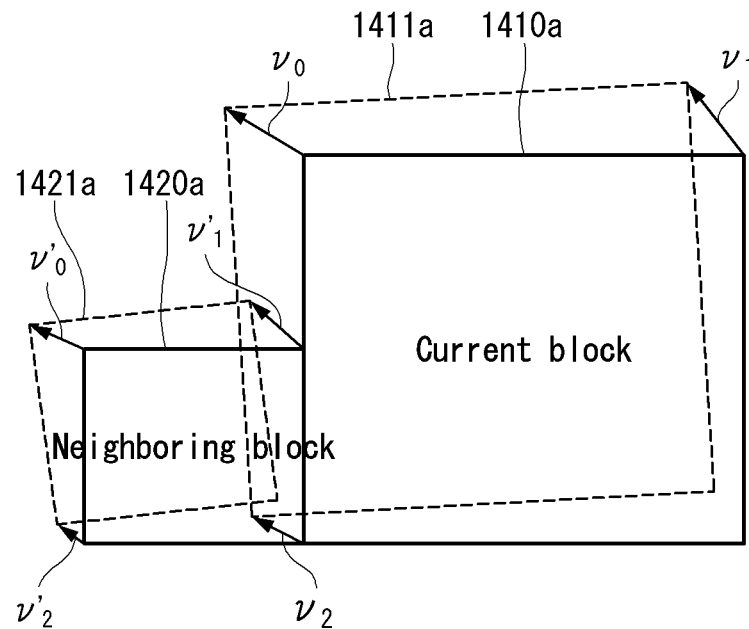
FIGS. 14A and 14B are diagrams illustrating a method of deriving motion information of a control point according to an embodiment of the present invention.
Figure 14B:
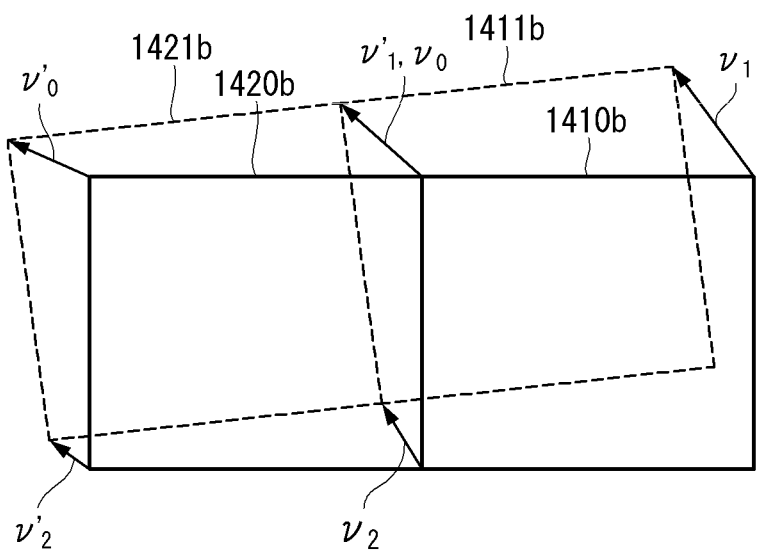

FIGS. 14A and 14B are diagrams illustrating a method of deriving motion information of a control point according to an embodiment of the present invention.

Referring to FIG. 14A, when specific distortion occurs in a current picture with respect to a reference picture, the degree of distortion, such as the center point of rotation, an angle of rotation, and a parallel-moved degree, between a current block 1410*a* and a reference block 1411*a* may be different from the degree of distortion between a neighboring block 1420*a* and a reference block 1421*a* of the neighboring block.

Accordingly, the slope/size of the motion vector of each CP of the current block 1410*a* may be different from the slope/size of the motion vector of each CP of the neighboring block 1420*a*.

Furthermore, if the sizes of a neighboring block 1420*b* and current block 1410*b* are the same as in FIG. 14B, the center point of rotation between the current block 1410*b* and a reference block 1411*b* is different from the center point of rotation between the neighboring block 1420*b* and a reference block 1421*b* of the neighboring block, but angles of rotation thereof may be the same.

In this case, both the slope/size of the motion vector of each CP of the current block 1410*b* may be different from both the slope/size of the motion vector of each corresponding CP of the neighboring block 1420*b*.

Accordingly, when specific distortion occurs as in FIGS. 14A and 14B, when the motion vector of each CP of the current block 1410 is derived from the motion vector of each corresponding CP of the neighboring block 1420, the motion vector of each CP of the current block may be derived by taking into consideration a "difference between the coordinates of a CP of the neighboring block 1420 and the coordinates of a CP of the current block 1410" and a "CP change in the horizontal/vertical direction of the neighboring block 1420 (i.e., a difference between V'_0 and V'_1 (horizontal direction) and a difference between V'_0 and V'_2 (vertical direction))."

Meanwhile, FIGS. 14A and 14B illustrate a case where the size of the neighboring block is smaller than the size of the current block, but the present invention is not limited thereto. The above method may be identically applied to a case where the size of a neighboring block is greater than or equal to the size of a current block.

Furthermore, FIGS. 14A and 14B illustrate only a case where the motion vector of a CP of a current block is derived from the motion vector of a CP of a neighboring block, for convenience of description. However, the above method may be identically applied to a case where the motion vector of a CP of a current block is derived from the motion vector of a CP of a block of a temporally different reference picture.

The decoder can use different motion information for each pixel in order to generate a prediction block for a current block because it can calculate separate motion information at a specific position in each pixel unit within a block according to Equations 1 and 2.

Alternatively, a current block may be split into sub-blocks, and a prediction block may be generated in each sub-block unit. This is described below with reference to the following drawing.

Figure 15:
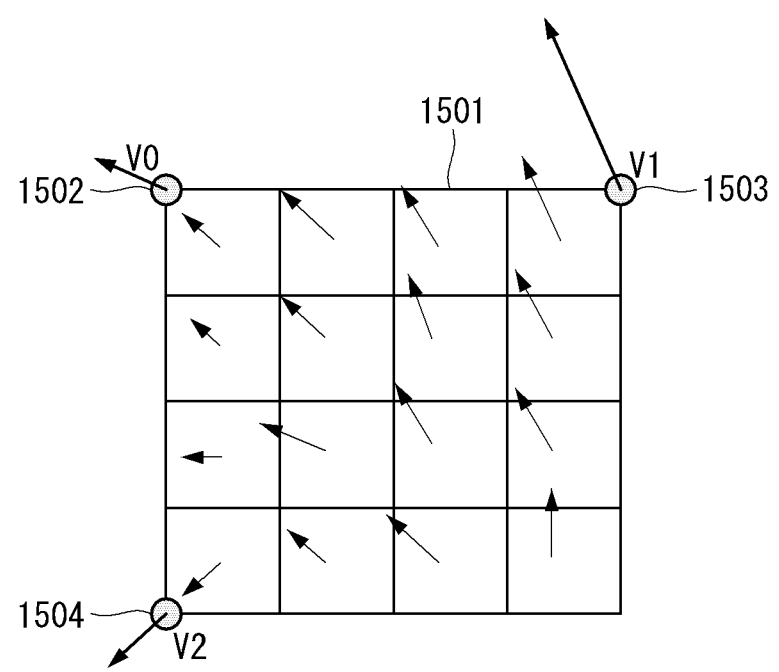
FIG. 15 is a diagram illustrating a method using sub-block unit motion information according to an embodiment of the present invention.

FIG. 15 is a diagram illustrating a method using sub-block unit motion information according to an embodiment of the present invention.

FIG. 15 illustrates a case where a current block 1501 is split into a total of 16 sub-blocks, for convenience of description, but the present invention is not limited thereto. The number of sub-blocks split from a current block may be different. Furthermore, the number of sub-blocks split for each block may be differently (i.e., independently) determined.

Referring to FIG. 15, after the current block 1501 is split into a plurality of sub-blocks, motion information represented as a sub-block unit may be obtained. A prediction block may be generated in units of sub-block using the obtained motion information. That is, different motion information may be used for each sub-block in order to generate a prediction block for a current block. Accuracy of a prediction block can be improved using different motion information in units of sub-block as described above.

Meanwhile, FIG. 15 illustrates a case where a single piece of motion information is used as representative motion information of a sub-block, for convenience of description. However, a plurality of pieces of motion information may be used as representative motion information of a sub-block. This is described later more specifically.

In this case, a specific value may be determined and used as the size and/or split form of a sub-block.

In this case, the size (e.g., 4×4, 8×8, 4×2) and/or split form (e.g., N×N, 2N×N as in FIG. 4) of a sub-block may be previously fixed and used. In this case, the encoder may not need to additionally signal information related to the spit of a sub-block with respect to the decoder.

In contrast, in order for the decoder to split a sub-block using the same method as that of the encoder, the size (e.g., 4×4, 8×8, 4×2) and/or split form (e.g., N×N, 2N×N as in FIG. 4) of a sub-block may be signaled from the encoder to the decoder.

Alternatively, the size or split form of a sub-block may be variably determined. That is, the size and/or split form of a sub-block may be determined based on motion information in each CP of a current block.

For example, the width of a sub-block may be determined based on a difference between motion information V0 of an upper left CP 1502 and motion information V1 of an upper right CP 1503, and the height of the sub-block may be determined in reverse proportion to the difference between motion information based on a difference between the motion information V0 of the upper left CP 1502 and motion information V2 of the lower left CP 1504.

In this case, the difference between motion information may be calculated as a difference between the sizes (i.e., absolute values) of motion information and may be calculated as a result of a comparison between motion information in the horizontal direction and motion information in the vertical direction.

That is, more accurate motion information is incorporated using the width and height of a sub-block as great values if the difference between motion information is small and using the width and height of a sub-block as small values if the difference between motion information is great. If a difference in motion information between CPs is great, the size of a sub-block may be determined to be small because the distortion of each sample may be determined to be great. Likewise, if a difference in motion information between CPs is small, the size of a sub-block may be determined to be great because the distortion of each sample may be determined to be small.

The width or height of a current block may be used as a reference value for determining whether a difference in motion information between CPs is great or small. Furthermore, a fixed threshold may be used as a reference value for determining whether a difference in motion information between CPs is great or small. Furthermore, a combination of a width or height and a fixed threshold may be used as a reference value for determining whether a difference in motion information between CPs is great or small.

In this case, if a difference between the motion information V0 of the upper left CP 1502 and the motion information V1 of the upper right CP 1503 is less than a predetermined threshold, the width of a sub-block may be the same as the width of a block. That is, a sub-block may not be split in the horizontal direction.

Likewise, if the motion information V0 of the upper left CP 1502 and the motion information V2 of the lower left CP 1504 is less than a predetermined threshold, the height of a sub-block may be the same as the height of a sub-block. That is, a sub-block may not be split in the vertical direction.

If the split size and/or split form of a sub-block is determined based on a difference in motion information between CPs as described above, the encoder and the decoder perform the same operation, so additional information about the split size and/or split form of a sub-block may not be signaled from the encoder to the decoder.

Alternatively, the encoder may determine the split size and/or split form of a sub-block based on a difference in motion information between CPs. The encoder may signal to the decoder for additional information about the split size and/or split form of a sub-block.

In this case, in order to specify each sub-block within a current block, the encoder may signal to the decoder for x-axis and/or y-axis coordinates for specifying each sub-block based on the coordinates of the upper left edge of the current block (e.g., assuming that the coordinates of the upper left edge of the current block is (0, 0)).

Furthermore, in order to reduce the amount of signaling information, the encoder may signal to the decoder for x-axis and/or the y-axis coordinates for specifying a specific sub-block based on the coordinates of the specific edge of a neighboring sub-block (e.g., assuming that the coordinates of the specific edge of the neighboring sub-block is (0, 0)) in order to specify each sub-block within a current block.

A method of deriving motion information represented as each sub-block unit within a current block is described below.

Figure 16:
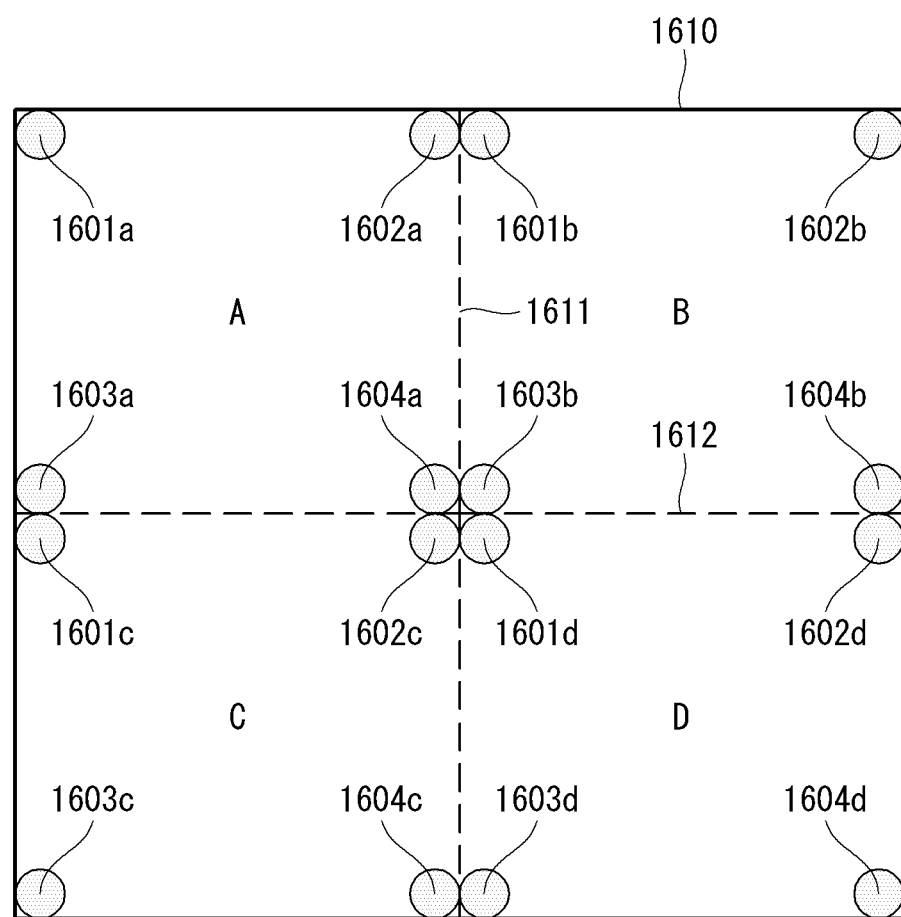
FIG. 16 is a diagram illustrating a method of determining motion information of a sub-block unit according to an embodiment of the present invention.

FIG. 16 is a diagram illustrating a method of determining motion information of a sub-block unit according to an embodiment of the present invention.

Referring to FIG. 16, one sub-block 1601 may be divided into a total of four regions A, B, C, and D based on a center line 1602 in an x-axis direction and a center line 1603 in a y-axis direction. That is, a point where the center line 1602 in the x-axis direction and the center line 1603 in the y-axis direction within one sub-block 1601 meet correspond to the center point of the corresponding sub-block 1601.

In this case, a candidate for deriving motion information to represent the corresponding sub-block 1601 may correspond to motion information of a reference point (i.e., a reference pixel/sample) corresponding to the four edges of the respective regions A, B, C, and D within the corresponding sub-block 1601.

For example, motion information about each of the upper left reference point 1601*a*, upper right reference point 1602*a*, lower left reference point 1603*a* and lower left reference point 1604*a* of the region A, motion information about each of the upper left reference point 1601*b*, upper right reference point 1602*b*, lower left reference point 1603*b* and lower left reference point 1604*b* of the region B, motion information about each of the upper left reference point 1601*c*, upper right reference point 1602*c*, lower left reference point 1603*c* and lower left reference point 1604*c* of the region C, and motion information about each of the upper left reference point 1601*d*, upper right reference point 1602*d*, lower left reference point 1603*d* and lower left reference point 1604*d* of the region D may correspond to candidates of motion information to represent the current sub-block 1610.

1) Various reference points may be present as candidates for determining representative motion information of a sub-block as described above. One of pieces of motion information may be determined as representative motion information of a corresponding sub-block.

1-1) In this case, all of sub-blocks may obtain representative motion information of a corresponding sub-block from a reference point at the same position regardless of the position of each sub-block within a current block.

For example, motion information of a reference point at the same position may be selected as representative motion information of a corresponding sub-block with respect to all of sub-blocks, such as the upper left reference point 1601*a* or center reference point 1604*a*, 1603*b*, 1602*c* or 1601*d* of the sub-block.

1-2) Alternatively, motion information of a different reference point may be selected as motion information of a corresponding sub-block based on a position where a sub-block is present within a current block for each sub-block within the current block.

For example, if a CP is included or in the case of a neighboring sub-block (e.g., the upper left sub-block, the upper right sub-block and the lower left sub-block in FIG. 15), motion information of the CP may be determined as representative motion information of a corresponding sub-block. If not, representative motion information may be obtained from a specific center reference point 1604*a*, 1603*b*, 1602*c* or 1601*d*. If the sub-block of FIG. 16 is the upper left sub-block of FIG. 15, the upper left reference point 1601*a* of the sub-block of FIG. 16 may correspond to the CP 1502 in FIG. 15. In this case, motion information of the CP 1502 of a corresponding block is used as representative motion information of the sub-block of FIG. 16.

2) The position of a reference point determined as representative motion information of a sub-block may be previously defined or signaled from the encoder to the decoder.

2-1) In this case, the position of the reference point used as the representative motion information of the sub-block may be previously fixed and defined and may have been known to both the encoder and the decoder.

For example, if representative motion information of a corresponding sub-block is derived regardless of the position of the sub-block as in 1-1) or by taking into consideration the position of the sub-block as in 1-2), the position of a reference point used as the representative motion information of the sub-block may be previously fixed and defined.

In this case, there is an advantage in that the encoder does not need to signal supplementary information related to representative motion information of a sub-block.

2-2) Alternatively, the encoder may signal to the decoder for the position of a reference point used as representative motion information of a sub-block.

For example, although representative motion information of all of sub-blocks within a current block is derived from reference points at the same position as in 1-1), a reference point at a different position may be used for each block. In this case, the encoder may signal to the decoder for position information of a reference point for each block.

Alternatively, representative motion information may be derived from a different reference point for each sub-block depending on the position of a sub-block as in 1-2). In this case, the encoder may signal to the decoder for position information of a reference point for each sub-block (or for each block).

Embodiment 2

As described in Embodiment 1 according to the present invention, a prediction block for a current block may be generated by calculating separate motion information at a specific position in each pixel unit within a block according to Equations 1 and 2.

However, to generate a prediction block by applying different motion information on a pixel-by-pixel basis may cause an additional computational load or an excessive memory access problem. Accordingly, the present embodiment proposes a method of incorporating different motion information on a pixel-by-pixel basis using an optical flow algorithm, but affecting a pixel value in a prediction block instead of changing motion information.

The optical flow refers to a motion pattern, such as an object, a surface or an edge in a view. That is, the pattern of a motion of an object is obtained by sequentially extracting a difference between images in a specific time and a previous time. In this case, information about greater motions can be obtained compared to a case where only a difference between a current frame and a previous frame is obtained. The optical flow has a very important level of contribution, such as helping to find a target of a moving object in a visual cognition function of an animal having a sense of sight and helping to understand the structure of a surrounding environment. Technically, the optical flow may be used to interpret a 3-dimensional image in the computer vision system or may be used for image compression. Several methods of realizing the optical flow have been suggested.

In accordance with the existing motion compensation method to which the optical flow has been applied, the following equation is derived through two assumptions in which when an object moves for a short time, a pixel value thereof moves at a steady speed without being changed.

A detailed derivation process is as follows.

First, it is assumed that when an object moves for a short time, a pixel value thereof is not changed. It is assumed that a pixel value at (x, y) coordinates is I(x, y, t) in a time t and a pixel value when the object moves δx(=Vx), δy(=Vy) during a δt time is I(x+δx, y+δy, t+δt). Equation 3 is established according to the assumptions.

$$I(x,y,t)=I(x+\delta x, y+\delta y, t+\delta t) \quad \text{[Equation 3]}$$

When the right term of Equation 3 is developed in Taylor series, it may be listed like Equation 4.

$$I(x+\delta x, y+\delta y, t+\delta t) = \quad \text{[Equation 4]}$$
$$I(x, y, t) + \frac{\partial I}{\partial x}\delta x + \frac{\partial I}{\partial y}\delta y + \frac{\partial I}{\partial t}\delta t + \ldots$$

Second, it is assumed that the object moves at a steady speed for a short time. This is described below with reference to the following drawing.

Figure 17:
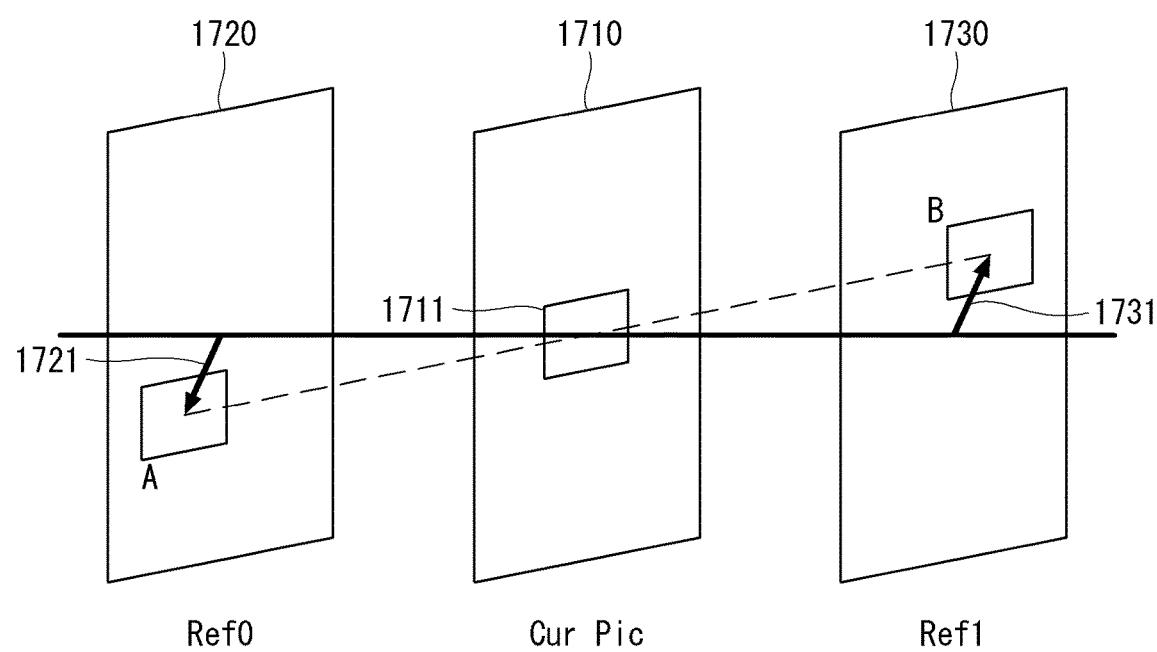
FIG. 17 illustrates a bi-directional prediction method of a picture having a steady motion as an embodiment to which the present invention may be applied.

FIG. 17 illustrates a bi-directional prediction method of a picture having a steady motion as an embodiment to which the present invention may be applied.

FIG. 17 illustrates a case where reference pictures (Ref) 1720 and 1730 are present in both directions of a current picture (Cur Pic) 1710.

In this case, assuming that an object has a steady motion as described above, an offset (i.e., first motion vector) 1721 from the coordinates of a current processing block 1711 within the current picture (Cur Pic) 1710 to the coordinates of a reference block A position within the reference picture 0 (Ref0) 1720 and an offset (i.e., second motion vector) 1731 from the coordinates of the current processing block 1711 within the current picture (Cur Pic) 1701 to the coordinates of a reference block B position within the reference picture 1 (Ref1) 1730 may be represented as symmetrical values. That is, the sizes of the first motion vector 1721 related to the reference block A position and the second motion vector 1731 related to the reference block B position may be represented as being identical and the directions thereof may be represented as being opposite.

A difference between pixel values at the reference block A position and the reference block B position according to the aforementioned two assumptions is arranged like Equation 5.

$$\Delta(i, j) = \quad \text{[Equation 5]}$$
$$A - B = I(x+\delta x, y+\delta y, t+\delta t) - I(x-\delta x, y-\delta y, t-\delta t) =$$
$$I(x, y, t) + \frac{\partial I}{\partial x}\delta x + \frac{\partial I}{\partial y}\delta y + \frac{\partial I}{\partial t}\delta t -$$
$$\left(I(x, y, t) - \frac{\partial I}{\partial x}\delta x - \frac{\partial I}{\partial y}\delta y - \frac{\partial I}{\partial t}\delta t\right) =$$
$$\left(\frac{\partial I}{\partial x}Vx + \frac{\partial I}{\partial y}Vy + \frac{\partial I}{\partial t}\right) - \left(-\frac{\partial I}{\partial x}Vx - \frac{\partial I}{\partial y}Vy + \frac{\partial I}{\partial t}\right) =$$
$$Vx(Ix(0)[i, j] + Ix(1)[i, j]) + Vy(Iy(0)[i, j] +$$
$$Iy(1)[i, j]) + P(0)[i, j] - (P(1)[i, j])$$

In Equation 5, (i, j) indicates the position of a specific pixel within the current processing block 1711.

Furthermore, $$\frac{\partial I}{\partial x}, \frac{\partial I}{\partial y}, \text{ and } \frac{\partial I}{\partial t}$$

indicate partial differentiations in an x-axis (horizontal axis), y-axis (vertical axis), and t axis (temporal axis), respectively. Accordingly, the change/gradient of the x-axis and y-axis at the (i, j) position may be indicated as Ix(k)[i, j] and Iy(k)[i, j] (k=0, 1), respectively. Furthermore, the gradient in the t axis, that is, a prediction pixel value may be indicated as P(k)[i, j] (k=0, 1).

The motion vectors Vx(i, j) and Vy(i, j) of a pixel unit to minimize Δ2(i, j) can be obtained according to Equation 5 because it has been assumed that when an object moves for a short time, a pixel value thereof is not changed.

As a result, an object is to find motion vectors at which the pixel value of the reference block A and the pixel value of the reference block B have the same value (or a value between the pixel values is minimum), but an error between the pixels may be great. Accordingly, a motion vector at which a difference between the pixel values is minimum within a specific window size can be found. Accordingly, assuming a locally steady motion within a window Ω on the basis of (i, j), when the window includes (2M+1)×(2M+1), the position within the window may be indicated as (i', j'). In this case, (i', j') satisfies i−M≤i'≤i+M, j−M≤j'≤j+M.

Accordingly, a motion vector to minimize $\Sigma_\Omega \Delta^2(i', j')$ is found.

$$Gx=(Ix(0)[i',j']+Ix(1)[i',j'])$$

$$Gy=(Iy(0)[i',j']+Iy(1)[i',j'])$$

$$\delta P=(P(0)[i',j']-P(1)[i',j']) \quad \text{[Equation 6]}$$

Gx indicates the sum of gradients in the x-axis, Gy indicates the sum of gradients in the y-axis, and OP indicates the sum of gradients, that is, prediction pixel values, in the t axis.

When each term in Equation 5 is arranged using Equation 6, it may be represented like Equation 7.

$$\Delta 2(i',j') = (Vx\Sigma_\Omega Gx + Vy\Sigma_n Gy + \Sigma_\Omega \delta P)2 \quad \text{[Equation 7]}$$

When Equation 7 is arranged using Vx, Vy through partial differentiations, it may be represented like Equation 8.

$$Vx\Sigma_\Omega G^2x + Vy\Sigma_\Omega GxGy + \Sigma_\Omega Gx\delta P = 0$$

$$Vx\Sigma_\Omega GxGy + Vy\Sigma_\Omega G^2y + \Sigma_\Omega Gy\delta P = 0 \quad \text{[Equation 8]}$$

Assuming that $s1=\Sigma_n G^2x$, $s2=s4=\Sigma_\Omega GxGy$, $s3=-\Sigma_\Omega Gx\delta P$, $s5=\Sigma_\Omega G^2y$, and $s6=-\Sigma_\Omega Gy\delta P$, Vx and Vy of Equation 8 are arranged as an equation, such as Equation 9.

$$Vx = \frac{s3s5 - s2s6}{s1s5 - s2s4} \quad \text{[Equation 9]}$$

$$Vy = \frac{s1s6 - s3s4}{s1s5 - s2s4}$$

Accordingly, a predicator can be calculated like Equation 10 using Vx and Vy.

$$P[i,j] = ((P(0)[i,j] + P(1)[i,j]) + Vx[i,j](Ix(0)[i,j] - Ix(1)[i,j]) + Vy[i,j](Iy(0)[i,j] - Iy(1)[i,j])) >> 1 \quad \text{[Equation 10]}$$

In Equation 10, P[i, j] indicates the predicator of each pixel [i, j] within the current block. P^(0)[i, j] and P^(1)[i, j] indicate pixel values belonging to a reference block L0 and a reference block L1, respectively.

The motion vector and reference value of each pixel unit may be calculated using an optical flow as described above.

As described in Embodiment 1, representative motion information of a sub-block unit and a corresponding prediction block can be generated in both directions according to an affine transformation. Furthermore, motion information and a corresponding prediction block can be generated in a block unit according to an affine transformation.

In this case, the decoder may apply the aforementioned optical flow algorithm in a unit to which an affine transformation is applied (i.e., a sub-block or block). Accordingly, a prediction block may be updated on a pixel-by-pixel basis. That is, the decoder generates a predicator on a pixel-by-pixel basis by applying the optical flow algorithm to a prediction block of a current block, so the prediction block may be updated.

Embodiment 3

If a prediction block using an affine transformation is generated from bi-directional prediction, the prediction block can be updated on a pixel-by-pixel basis by applying the optical flow algorithm using a method, such as Embodiment 2.

However, in the case of unidirectional prediction, the application of the optical flow algorithm is impossible because only one predicator of a pixel unit is present. In the present embodiment, a method of performing the update of a prediction block on a pixel-by-pixel basis by applying the optical flow algorithm to unidirectional prediction is described.

As in FIG. 15, representative motion information of a sub-block unit in a prediction block generated by an affine transformation may correspond to a middle value generated by incorporating the position of each sub-block based on motion information in each CP.

Accordingly, a plurality of prediction blocks may be generated based on a plurality of specific positions within a sub-block.

The position of a reference point within a sub-block for generating a plurality of prediction blocks may be set in various manners. This is described below with reference to the following drawing.

Figure 18A:
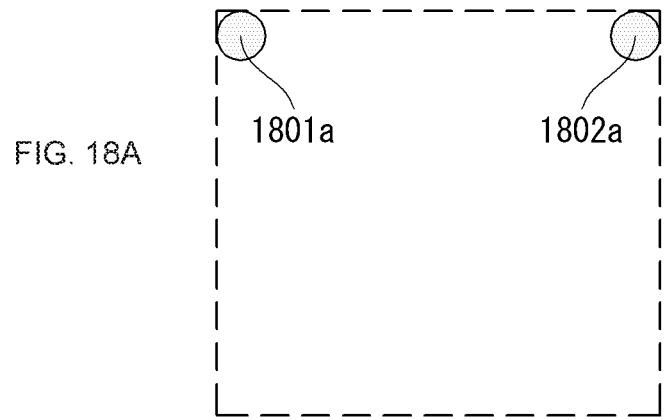
FIGS. 18A to 18C are diagrams illustrating a method of selecting a plurality of reference points of a sub-block unit according to an embodiment of the present invention.
Figure 18B:
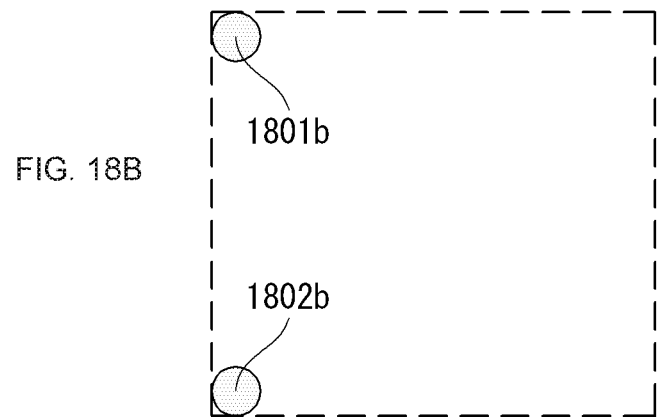
Figure 18C:
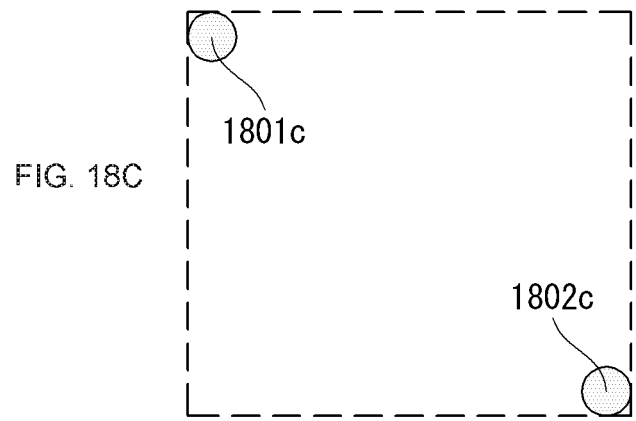

FIGS. 18A to 18C are diagrams illustrating a method of selecting a plurality of reference points of a sub-block unit according to an embodiment of the present invention.

FIGS. 18A to 18C illustrate a case where motion information of the upper left reference point 1801*a* and upper right reference point 1802*a* of a sub-block has been selected as representative motion information. FIG. 18B illustrates a case where motion information of the upper left reference point 1801*b* and lower left reference point 1802*b* of a sub-block has been selected as representative motion information. FIG. 18C illustrates a case where motion information of the upper left reference point 1801*c* and lower left reference point 1802*c* of a sub-block has been selected as representative motion information.

FIGS. 18A to 18C are only one example, but the present invention is not limited thereto. Motion information of a plurality of (e.g., 2) reference points of the various reference point the candidates illustrated in FIG. 16 may be determined to be representative motion information.

A plurality of prediction blocks may be generated using a plurality of pieces of motion information because motion information of a plurality of reference points (i.e., reference pixels/samples) within a sub-block is used as representative motion information as described above. A change/gradient in the horizontal, vertical direction can be derived using a plurality of prediction blocks. The optical flow algorithm may be applied in a (sub) block unit using Equation 3 to Equation 10. As in the case where the optical flow has been applied to bidirectional prediction in Embodiment 2 as described above, a predicator is generated on a pixel-by-pixel basis by applying the optical flow using a plurality of prediction blocks specified based on a plurality of pieces of motion information, so a prediction block of a current block can be updated.

In this case, the positions of the plurality of reference points have been previously defined. The encoder may not need to transmit signaling to the decoder or position information about the plurality of reference points selected for each sub-block (or for each block) may be signaled to the decoder.

In this case, for example, a plurality of reference points at the same position may be selected regardless of the position of a sub-block with respect to all of sub-blocks within a block as in FIG. 18A, 18B or 18C.

Alternatively, a plurality of reference points at different positions may be selected for each sub-block depending on the position of a sub-block within a block. Furthermore, the update of a prediction block of a pixel unit may not be applied (i.e., apply the optical flow) to all of sub-blocks within a block. This is described below with reference to the following drawing.

Figure 19A:
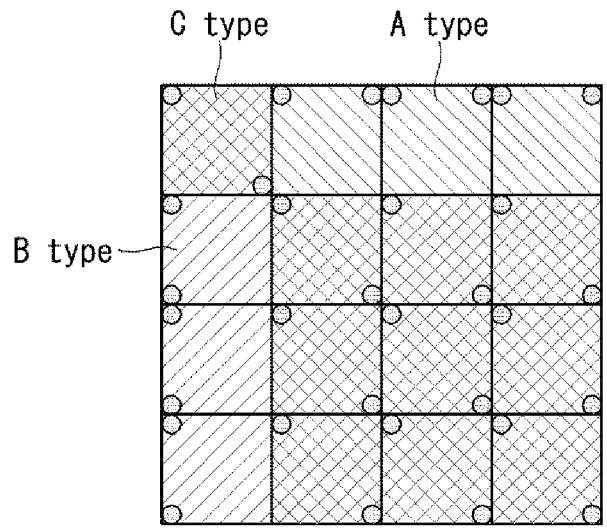
FIGS. 19A and 19B are diagrams illustrating a method of selecting a plurality of reference points of a sub-block unit according to an embodiment of the present invention.
Figure 19B:
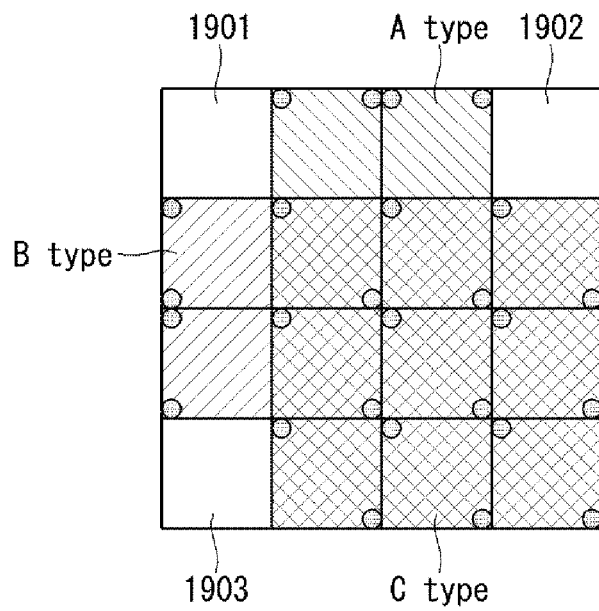

FIGS. 19A and 19B are diagrams illustrating a method of selecting a plurality of reference points of a sub-block unit according to an embodiment of the present invention.

In FIGS. 19A and 19B, a case where a plurality of reference points is selected as in FIG. 18A is shown as a type A. A case where a plurality of reference points is selected as in FIG. 18B is shown as a type B. A case where a plurality of reference points is selected as in FIG. 18C is shown as a type C.

As in FIG. 19A, the position of a reference point for generating a plurality of prediction blocks may be differently applied depending on the position of a sub-block within a block.

Furthermore, as in FIG. 19B, the update of a prediction block on a pixel-by-pixel basis may not be applied (i.e., an optical flow is applied) on specific sub-blocks 1901, 1902, and 1903, but two prediction blocks may be generated by applying a fixed specific reference point or a different reference point according to a sub-block position to the remaining sub-blocks.

In this case, a sub-block to which the pixel-unit prediction block update is not applied may correspond to one or more specific sub-blocks within a block.

Furthermore, a sub-block to which the pixel-unit prediction block update is not applied may include each C of a corresponding block or may be one or more neighboring sub-blocks. In this case, in a sub-block to which the pixel-unit prediction block update is not applied, a unidirectional prediction-based prediction block may be generated using motion information of a single reference point (e.g., CP) selected within a corresponding sub-block as in the aforementioned method.

As in FIGS. 19A and 19B, the positions of a plurality of reference points selected depending on the position of a sub-block within a block or the position of a sub-block to which the update of a prediction block is not applied on a pixel-by-pixel basis is only one example, and the present invention is not limited thereto. That is, the positions of a plurality of reference points selected depending on the position of a sub-block within a block may be differently determined in various manners. The position of a sub-block to which the update of a prediction block is not applied on a pixel-by-pixel basis may also be determined in various manners.

As described above, a plurality of (e.g., 2) reference points may be selected within a single sub-block, and a plurality of prediction blocks may be generated through the motion vectors of the plurality of reference points. Furthermore, when a gradient in the horizontal, vertical direction is calculated through the plurality of generated prediction blocks, the prediction block may be updated on a pixel-by-pixel basis by applying the optical flow algorithm as in Equation 10.

Meanwhile, Equation 10 includes the two portions of a prediction block portion (i) before the gradient in the horizontal, vertical direction is applied and a gradient portion (ii) in the horizontal, vertical direction. That is, the portions (i) and (ii) may be indicated as in Equation 11.

$$P[i,j]=((P(0)[i,j]+P(1)"(i)"+Vx[i,j](Ix(0)[i,j]-Ix(1)[i,j])+Vy[i,j](Iy(0)[i,j]-Iy(1)[i,j]))"(ii)">>1 \quad \text{[Equation 11]}$$

In this case, the plurality of prediction blocks obtained from the plurality of reference points within the sub-block may be used for the portion (i).

Alternatively, one prediction block obtained a single reference point within a sub-block may be used for the portion (i). In this case, Equation 11 may be represented like Equations 12 and 13.

$$P[i,j]=P(0)[i,j]"(i)"+Vx[i,j](Ix(0)[i,j]-Ix(1)[i,j])+Vv[i,j](Iy(0)[i,j]-Iy(1)[i,j]))"(ii)">>1 \quad \text{[Equation 12]}$$

$$P[i,j]=P(1)[i,j]"(i)"+Vx[i,j](Ix(0)[i,j]-Ix(1)[i,j])+Vy[i,j](Iy(0)[i,j]-Iy(1)[i,j]))"(ii)">>1 \quad \text{[Equation 13]}$$

That is, a prediction block obtained based on motion information of a single reference point on a pixel-by-pixel basis can be updated based on the gradient in the horizontal, vertical direction calculated by applying the optical flow on the plurality of prediction blocks obtained based on the motion information of the plurality of reference points as in Equation 12 or Equation 13.

Figure 20:
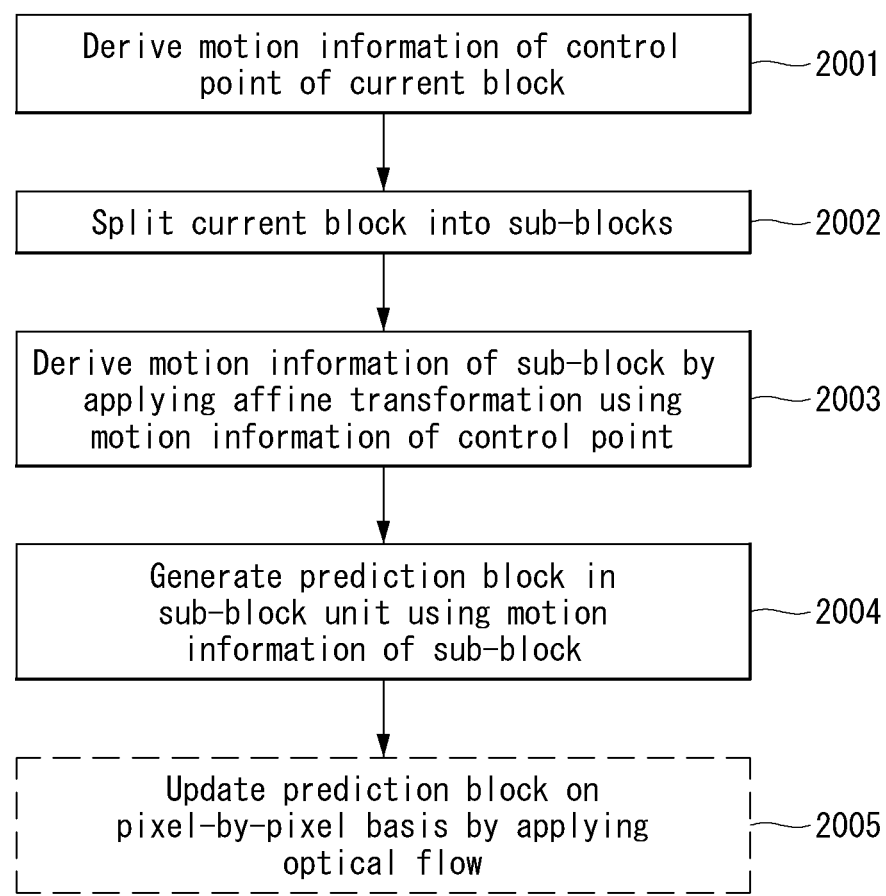
FIG. 20 is a diagram illustrating an inter-prediction-based image processing method according to an embodiment of the present invention.

FIG. 20 is a diagram illustrating an inter-prediction-based image processing method according to an embodiment of the present invention.

Referring to FIG. 20, the decoder derives motion information of a control point (or a control pixel/sample) of a current block (S2001).

In this case, as described above, the control point means a reference point used to specify a reference block among reference points (or reference pixels/samples) located at the edges of the current block or neighboring the current block, and may include two to four reference points.

In this case, as described above, the decoder may derive the motion information of the control point of the current block from motion information of a neighboring block (or motion information of a specific CP of the neighboring block) or motion information of the reference block of a temporally different reference picture (or motion information of a specific CP of the reference block) in the same manner/like the merge mode.

Alternatively, as described above, the decoder may derive the motion information of the control point of the current block by adding up motion information of a neighboring block (or motion information of a specific CP of the neighboring block) or motion information of a reference block of a temporally different reference picture (or motion information of a specific CP of the reference block) and compensation information in the same manner/like the AMVP mode.

Furthermore, as in the example of FIG. 13, the decoder may derive motion information of each control point of the current block by correcting motion information of a neighboring block (or a block of a temporally different picture) (or motion information of each control point of a corresponding block) using a difference (or ratio) between the size of the current block and the size of the neighboring block (or the block of the temporally different picture).

Furthermore, as in the example of FIGS. 14A and 14B, the decoder may derive motion information of each control point of the current block by correcting motion information of a neighboring block (or a block of a temporally different picture) (or motion information of each control point of a corresponding block) using a "difference between the coordinates of the control point of the neighboring block and the coordinates of the control point of the current block" and a "change of a control point in the horizontal/vertical direction of the neighboring block." The decoder splits the current block into sub-blocks (S2002).

In this case, as described above, the decoder may split the current block into sub-blocks using the predefined size and/or split form of a sub-block or based on information signaled by the encoder.

Alternatively, as described above, the decoder may split the current block into sub-blocks based on a difference between pieces of motion information of control points within the current block. That is, the size and/or split form of a sub-block may be determined based on motion information in each control point of the current block.

For example, the width of a sub-block may be determined based on a difference between the motion information V0 of the upper left control point and the motion information V1 of the upper right control point. The height of the sub-block may be determined based on a difference between the motion information V0 of the upper left control point and the motion information V2 of the lower left control point. For example, the sizes of the width and height may be determined in reverse proportion to the difference between the pieces of motion information.

The decoder derives motion information of a sub-block by applying an affine transformation using the motion information of the control point (S2003).

In this case, as described above, a single piece of motion information may be used as the motion information of the sub-block for each sub-block. That is, as in the example of FIG. 16, the decoder may select motion information of a single reference point as motion information of a sub-block within the corresponding sub-block.

Furthermore, a plurality of pieces of motion information may be used as the motion information of the sub-block. As in the examples of FIGS. 18A to 18C and 19A and 19B, the decoder may select motion information of a plurality of reference points as motion information of a sub-block within the corresponding sub-block.

Motion information of a (single/a plurality of) reference points selected as described above may be derived by applying an affine transformation using motion information of a control point of a corresponding block as in Equations 1 and 2.

The decoder generates a prediction block in units of sub-block using the motion information of the sub-block (S2004).

In this case, if motion information of a single reference point within a sub-block is used as motion information of the corresponding sub-block in step S2003, the decoder may identify a single reference block from a previously decoded picture using the motion information of the sub-block, and may predict a current sub-block based on the identified reference block (i.e., may generate a prediction block).

Alternatively, if motion information of a plurality of reference points in a sub-block is used as motion information of the corresponding sub-block in step S2003, the decoder may identify a plurality of reference blocks from a previously decoded picture using motion information of the sub-block, and may predict a current sub-block (i.e., may generate a prediction block) based on the identified reference blocks.

As described in Embodiment 2, the decoder may update the prediction block on a pixel-by-pixel basis by applying an optical flow (S2005).

That is, if motion information of a plurality of reference points in the sub-block is used in step S2003, the decoder may update the prediction block on a pixel-by-pixel basis by applying an optical flow using the plurality of obtained prediction blocks.

In this case, as in Equation 12 or Equation 13, the decoder may generate a prediction block based on motion information of a single reference point, and may update the generated prediction block on a pixel-by-pixel basis based on a gradient in the horizontal, vertical direction calculated by applying an optical flow to the plurality of generated prediction blocks using the motion information of the plurality of reference points.

Meanwhile, an optical flow may not be applied to a sub-block predicted using only motion information of a single reference point.

Furthermore, an optical flow may not be applied to a sub-block including a control point or adjacent to the control point. That is, an optical flow may be applied to only a sub-block not including or not neighboring a control point.

In the case of a sub-block to which an optical flow is not applied as described above, the generation of a prediction block of a corresponding sub-block is completed through step S2004, and step S2005 may not be performed.

Figure 21:
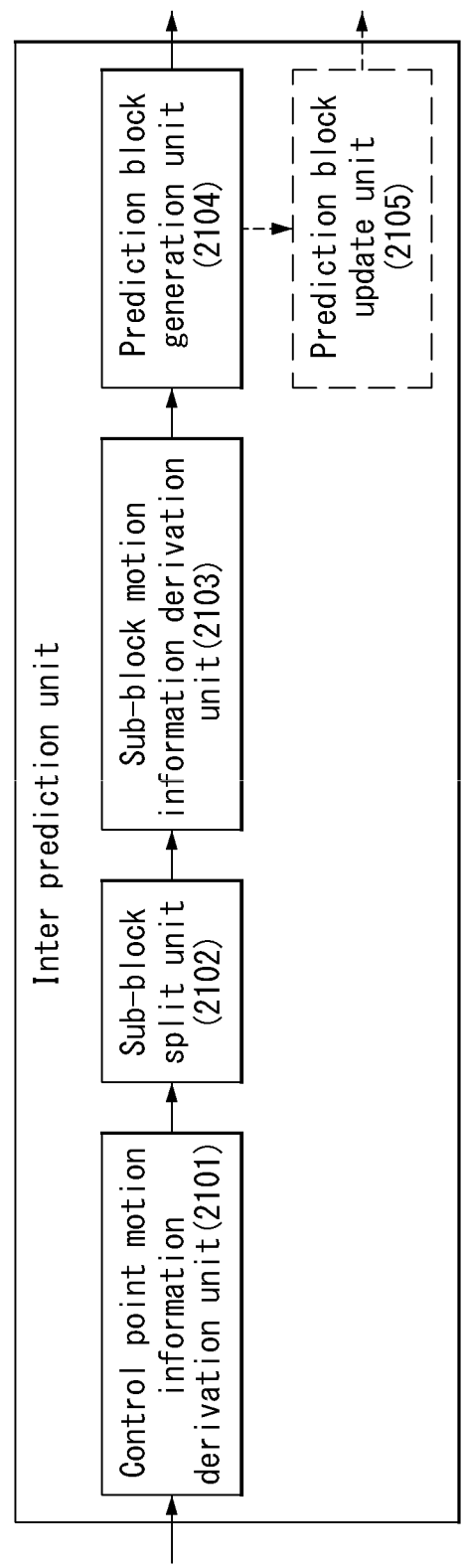
FIG. 21 is a diagram illustrating an inter-prediction unit according to an embodiment of the present invention.

FIG. 21 is a diagram illustrating an inter-prediction unit according to an embodiment of the present invention.

FIG. 21 shows the inter-prediction unit (181, refer to FIG. 1; 261, refer to FIG. 2) as one block, for convenience of description, but the inter-prediction unit 181, 261 may be implemented as an element included in the encoder and/or the decoder.

Referring to FIG. 21, the inter-prediction unit 181, 261 implements the functions, processes and/or methods proposed in FIGS. 5A and 5B to 20. Specifically, the inter-prediction unit 181, 261 may include a control point motion information derivation unit 2101, a sub-block split unit 2102, a sub-block motion information derivation unit 2103, and a prediction block generation unit 2104. Furthermore, the inter-prediction unit may be configured to additionally include a prediction block update unit 2105.

The control point motion information derivation unit 2101 derives motion information of a control point (or a control pixel/sample) of a current block.

In this case, the control point motion information derivation unit 2101 may derive the motion information of the control point of the current block from motion information of a neighboring block (or motion information of a specific CP of the neighboring block) or motion information of a reference block of a temporally different reference picture (or motion information of a specific CP of the reference block) in the same manner/like the merge mode.

Alternatively, the control point motion information derivation unit 2101 may derive the motion information of the control point of the current block by adding up motion information of a neighboring block (or motion information of a specific CP of the neighboring block) or motion information of a reference block of a temporally different reference picture (or motion information of a specific CP of the reference block) and compensation information in the same manner/like the AMVP mode.

Furthermore, as in the example of FIG. 13, the control point motion information derivation unit 2101 may derive motion information of each control point of the current block by correcting motion information of a neighboring block (or a block of a temporally different picture) (or motion information of each control point of a corresponding block) using a difference (or ratio) between the size of the current block and the size of the neighboring block (or the block of the temporally different picture).

Furthermore, as in the example of FIGS. 14A and 14B, the control point motion information derivation unit 2101 may derive the motion vector of each control point of the current block by correcting motion information of a neighboring block (or a block of a temporally different picture) (or motion information of each control point of a corresponding block) using a "difference between the coordinates of the control point of the neighboring block and the coordinates of the control point of the current block" and a "change of a control point in the horizontal/vertical direction of the neighboring block."

The sub-block split unit 2102 splits the current block into sub-blocks.

In this case, the sub-block split unit 2102 may split the current block into sub-blocks using the predefined size and/or split form of a sub-block or based on information signaled by the encoder.

Alternatively, the sub-block split unit 2102 may split the current block into sub-blocks based on a difference between pieces of motion information of control points within the current block. That is, the size and/or split form of a sub-block may be determined based on motion information in each control point of the current block.

For example, the width of a sub-block may be determined based on a difference between the motion information V0 of the upper left control point and the motion information V1 of the upper right control point. The height of the sub-block may be determined based on a difference between the motion information V0 of the upper left control point and the motion information V2 of the lower left control point. For example, the sizes of the width and height may be determined in reverse proportion to the difference between the pieces of motion information.

The sub-block motion information derivation unit 2103 may derive motion information of a sub-block by applying an affine transformation using motion information of a control point.

In this case, the sub-block motion information derivation unit 2103 may use a single piece of motion information as the motion information of the sub-block for each sub-block. That is, as in the example of FIG. 16, the sub-block motion information derivation unit 2103 may select motion information of a single reference point as motion information of a corresponding sub-block within a sub-block.

Furthermore, the sub-block motion information derivation unit 2103 may use a plurality of pieces of motion information as the motion information of the sub-block. As in the example of FIGS. 18A to 18C and 19A and 19B, the sub-block motion information derivation unit 2103 may select motion information of a plurality of reference points as motion information of a sub-block within the corresponding sub-block.

Motion information of a (single/a plurality of) reference points selected as described above may be derived by applying an affine transformation using motion information of a control point of a corresponding block as in Equations 1 and 2.

The prediction block generation unit 2104 generates a prediction block in units of sub-block using motion information of a sub-block.

In this case, if motion information of a single reference point within a sub-block is used as motion information of the corresponding sub-block, the prediction block generation unit 2104 may identify a single reference block from a previously decoded picture using the motion information of the sub-block, and may predict a current sub-block based on the identified reference block (i.e., may generate a prediction block).

Alternatively, if motion information of a plurality of reference points in a sub-block is used as motion information of the corresponding sub-block, the prediction block generation unit 2104 may identify a plurality of reference blocks from a previously decoded picture using motion information of the sub-block, and may predict a current sub-block (i.e., may generate a prediction block) based on the identified reference blocks.

Furthermore, if the prediction block update unit 2105 is further included, the prediction block update unit 2105 may update a prediction block on a pixel-by-pixel basis by applying an optical flow.

That is, if motion information of a plurality of reference points in a sub-block is used, the prediction block update unit 2105 may update a prediction block on a pixel-by-pixel basis by applying an optical flow using the plurality of obtained prediction blocks.

In this case, as in Equation 12 or Equation 13, the prediction block update unit 2105 may generate a prediction block based on motion information of a single reference point, and may update the generated prediction block on a pixel-by-pixel basis based on a gradient in the horizontal, vertical direction calculated by applying an optical flow to the plurality of generated prediction blocks using the motion information of the plurality of reference points.

Alternatively, an optical flow may not be applied to a sub-block predicted using only motion information of a single reference point.

Furthermore, an optical flow may not be applied to a sub-block including a control point or adjacent to the control point. That is, an optical flow may be applied to only a sub-block not including or not neighboring a control point.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

What is claimed is:

1. A method of decoding an image based on inter prediction, the method comprising:
    deriving, by a processor, at least two motion vectors of at least two control points of a current block;
    splitting, by the processor, the current block into sub-blocks;
    deriving, by the processor, a motion vector of each of at least a plurality of the sub-blocks based on the at least two motion vectors of the at least two control points of the current block;
    generating, by the processor, a prediction block for each of the plurality of sub-blocks based on the motion vector of each of the plurality of sub-blocks; and
    updating, by the processor, the prediction block for each of the plurality of sub-blocks pixel-by-pixel based on an optical flow,
    wherein the at least two motion vectors of the at least two control points of the current block are derived based on a motion vector of a control point of a neighboring block, and
    wherein a motion vector of one among the at least two control points of the current block is derived based on modifying of the motion vector of the control point of the neighboring block based on a difference between a position of an upper left sample of the neighboring block and a position of an upper left sample of the current block, and a difference between two motion vectors of two control points of the neighboring block with respect to at least one of a horizontal direction or a vertical direction.

2. The method of claim 1, wherein the motion vector of the one among the at least two control points of the current block is derived based on modifying of the motion vector of the control point of the neighboring block or the reference block based on a difference between a size of the current block and, a size of the neighboring block or the reference block.

3. The method of claim 1, wherein a size of the sub-block and/or a split type of the sub-block are determined based on the at least two motion vectors of the at least two control points of the current block.

4. The method of claim 3, wherein:
    a width of the sub-block is determined based on a difference between a motion vector of an upper left control point of the current block and a motion vector of an upper right control point of the current block, and
    a height of the sub-block is determined based on a difference between a motion vector of an upper left control point of the current block and a motion vector of a lower left control point of the current block.

5. The method of claim 1, wherein a motion vector of a specific reference point in the sub-block is used as the motion vector of the sub-block.

6. The method of claim 5, wherein in case of a sub-block comprising the control point or adjacent to the control point, a motion vector of the control point is used as the motion vector of the sub-block.

7. The method of claim 5, wherein a motion vector of a plurality of reference points in the sub-block is used as the motion vector of the sub-block.

8. The method of claim 1, wherein:
    the prediction block is generated based on a motion vector of a single reference point, and
    the generated prediction block is updated pixel-by-pixel based on the optical flow to a plurality of prediction blocks derived based on a motion vector of a plurality of reference points.

9. The method of claim 1, wherein the optical flow is applied only for sub-blocks that do not include the control point or are not adjacent to the control point.

10. The method of claim 1, wherein the neighboring block comprises a block adjacent to a bottom-left corner of the current block.

11. A method of encoding an image based on inter prediction, comprising:
    deriving, by a processor, at least two motion vectors of at least two control points of a current block;
    splitting, by the processor, the current block into sub-blocks;
    deriving, by the processor, a motion vector of each of the plurality of the sub-blocks based on the at least two motion vectors of the at least two control points of the current block;
    generating, by the processor, a prediction block for each of the plurality of sub-blocks based on the motion vector of each of the plurality of sub-blocks; and
    updating, by the processor, the prediction block for each of the plurality of sub-blocks pixel-by-pixel based on an optical flow,
    wherein the at least two motion vectors of the at least two control points of the current block are derived based on a motion vector of a control point of a neighboring block, and
    wherein a motion vector of one among the at least two control points of the current block is derived based on modifying of the motion vector of the control point of the neighboring block based on a difference between a position of an upper left sample of the neighboring block and a position of an upper left sample of the current block, and a difference between two motion vectors of two control points of the neighboring block with respect to at least one of a horizontal direction or a vertical direction.

12. A non-transitory computer-readable recording medium storing instructions that, when executed, cause one or more processors to perform operations comprising:
    deriving at least two motion vectors of at least two control points of a current block;
    splitting the current block into sub-blocks;
    deriving a motion vector of each of the plurality of sub-blocks based on the at least two motion vectors of the at least two control points of the current block;
    generating a prediction block for each of the plurality of sub-blocks based on the motion vector of each of the plurality of sub-blocks; and
    updating the prediction block for each of the plurality of sub-blocks pixel-by-pixel based on an optical flow,
    wherein the at least two motion vectors of the at least two control points of the current block are derived based on a motion vector of a control point of a neighboring block, and
    wherein a motion vector of one among the at least two control points of the current block is derived based on modifying of the motion vector of the control point of the neighboring block based on a difference between a position of an upper left sample of the neighboring block and a position of an upper left sample of the current block, and a difference between two motion vectors of two control points of the neighboring block with respect to at least one of a horizontal direction or a vertical direction.

13. The non-transitory computer-readable recording medium of claim 12, wherein the motion vector of the one among the at least two control points of the current block is derived based on modifying of the motion vector of the control point of the neighboring block or the reference block based on a difference between a size of the current block and, a size of the neighboring block or the reference block.

14. The non-transitory computer-readable recording medium of claim 12, wherein a size of the sub-block and/or a split type of the sub-block are determined based on the at least two motion vectors of the at least two control points of the current block.

15. The non-transitory computer-readable recording medium of claim 14, wherein:
   a width of the sub-block is determined based on a difference between a motion vector of an upper left control point of the current block and a motion vector of an upper right control point of the current block, and
   a height of the sub-block is determined based on a difference between a motion vector of an upper left control point of the current block and a motion vector of a lower left control point of the current block.

16. The non-transitory computer-readable recording medium of claim 12, wherein a motion vector of a specific reference point in the sub-block is used as the motion vector of the sub-block.

17. The non-transitory computer-readable recording medium of claim 16, wherein in case of a sub-block comprising the control point or adjacent to the control point, a motion vector of the control point is used as the motion vector of the sub-block.

18. The non-transitory computer-readable recording medium of claim 16, wherein a motion vector of a plurality of reference points in the sub-block is used as the motion vector of the sub-block.

19. The non-transitory computer-readable recording medium of claim 12, wherein:
   the prediction block is generated based on a motion vector of a single reference point, and
   the generated prediction block is updated pixel-by-pixel based on the optical flow to a plurality of prediction blocks derived based on a motion vector of a plurality of reference points.

20. The non-transitory computer-readable recording medium of claim 12, wherein the optical flow is applied only for sub-blocks that do not include the control point or are not adjacent to the control point.

* * * * *